(12) United States Patent
Naito

(10) Patent No.: US 11,355,983 B2
(45) Date of Patent: Jun. 7, 2022

(54) ELECTRIC MOTOR AND METHOD OF MANUFACTURING SUCH AN ELECTRIC MOTOR

(71) Applicant: MAKITA CORPORATION, Anjo (JP)

(72) Inventor: Akira Naito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 378 days.

(21) Appl. No.: 16/688,200

(22) Filed: Nov. 19, 2019

(65) Prior Publication Data

US 2020/0195076 A1    Jun. 18, 2020

(30) Foreign Application Priority Data

Dec. 14, 2018    (JP) .............................. JP2018-234697

(51) Int. Cl.
| | | |
|---|---|---|
| H02K 3/38 | (2006.01) | |
| H02K 29/08 | (2006.01) | |
| H02K 7/14 | (2006.01) | |
| H02K 7/116 | (2006.01) | |
| H02K 1/16 | (2006.01) | |
| H02K 3/50 | (2006.01) | |
| H02K 3/12 | (2006.01) | |
| H02K 3/48 | (2006.01) | |
| H02K 3/28 | (2006.01) | |

(52) U.S. Cl.
CPC ............. *H02K 3/38* (2013.01); *H02K 1/165* (2013.01); *H02K 3/12* (2013.01); *H02K 3/28* (2013.01); *H02K 3/48* (2013.01); *H02K 3/50* (2013.01); *H02K 7/116* (2013.01); *H02K 7/145* (2013.01); *H02K 29/08* (2013.01); *H02K 2203/03* (2013.01); *H02K 2203/09* (2013.01)

(58) Field of Classification Search
CPC ........... H02K 1/165; H02K 3/12; H02K 3/28; H02K 3/38; H02K 3/48; H02K 3/50; H02K 7/116; H02K 7/145; H02K 2203/03; H02K 2203/09
USPC ............................................ 310/51, 71, 182
See application file for complete search history.

(56) References Cited

U.S. PATENT DOCUMENTS

| | | |
|---|---|---|
| 4,132,460 A | 1/1979 | Porta |
| 5,201,146 A | 4/1993 | Fushiya |
| 6,120,362 A | 9/2000 | Etter et al. |
| 6,320,286 B1 | 11/2001 | Ramarathnam |
| 6,494,590 B1 | 12/2002 | Paganini et al. |

(Continued)

FOREIGN PATENT DOCUMENTS

| | | |
|---|---|---|
| CN | 102403815 A | 4/2012 |
| CN | 203019328 U | 6/2013 |

(Continued)

*Primary Examiner* — Rashad H Johnson
(74) *Attorney, Agent, or Firm* — J-Tek Law PLLC; Jeffrey D. Tekanic; Scott T. Wakeman

(57) ABSTRACT

A stator (25; 25A) includes an insulator (28, 29) held on a stator core (27), coils (30) wound around the insulator and on the stator core, fusing terminals (50) held by the insulator and connected to the coils, and a short-circuiting member (32) having first, second and third sheet-metal members (68A-68C) that are respectively connectable to the fusing terminals by virtue of the short-circuiting member being detachably attached to the insulator by screws (75, 76).

20 Claims, 22 Drawing Sheets

(56) References Cited

U.S. PATENT DOCUMENTS

| | | |
|---|---|---|
| 6,632,128 B2 | 10/2003 | Berger et al. |
| 6,993,829 B2 | 2/2006 | Kobayashi et al. |
| 7,388,312 B2 | 6/2008 | Hyodo et al. |
| 7,663,277 B2 | 2/2010 | Kinoshita et al. |
| 8,018,104 B2 | 9/2011 | Yagai et al. |
| 8,035,263 B2 | 10/2011 | Kienzler et al. |
| 8,193,677 B2 | 6/2012 | Murakami et al. |
| 8,253,285 B2 | 8/2012 | Yoshida et al. |
| 8,398,465 B2 | 3/2013 | Hoeschele et al. |
| 8,421,282 B2 | 4/2013 | Ota |
| 8,657,033 B2 | 2/2014 | Sengiku et al. |
| 8,784,164 B2 | 7/2014 | Dai |
| 8,810,085 B2 | 8/2014 | Matsunaga et al. |
| 8,816,544 B2 | 8/2014 | Tanimoto et al. |
| 8,952,581 B2 | 2/2015 | Naito et al. |
| 9,948,162 B2 | 4/2018 | Nagahama et al. |
| 9,954,418 B2 | 4/2018 | Kawakami et al. |
| 10,348,158 B2* | 7/2019 | Niwa .................... H02K 29/08 |
| 10,749,405 B2* | 8/2020 | Nagahama ............... H02K 3/50 |
| 10,886,816 B2* | 1/2021 | Doan .................... B25D 17/00 |
| 2002/0057067 A1 | 5/2002 | Steinbrink |
| 2002/0100597 A1 | 8/2002 | Numata |
| 2003/0163924 A1 | 9/2003 | Hempe et al. |
| 2003/0190877 A1 | 10/2003 | Gallagher et al. |
| 2004/0226969 A1 | 11/2004 | Shew |
| 2005/0153636 A1 | 7/2005 | Numata et al. |
| 2005/0196273 A1 | 9/2005 | Nishikawa et al. |
| 2006/0175913 A1 | 8/2006 | Hempe et al. |
| 2006/0214627 A1 | 9/2006 | Ito et al. |
| 2007/0296292 A1 | 12/2007 | Kienzler et al. |
| 2008/0222871 A1 | 9/2008 | Wilkinson et al. |
| 2008/0265695 A1* | 10/2008 | Yoshida .................... H02K 5/20 310/50 |
| 2009/0058215 A1 | 3/2009 | Murakami et al. |
| 2009/0207035 A1 | 8/2009 | Watanabe et al. |
| 2009/0280732 A1 | 11/2009 | Esenwein |
| 2010/0009608 A1 | 1/2010 | Lo et al. |
| 2010/0019592 A1 | 1/2010 | Altindis |
| 2010/0252293 A1 | 10/2010 | Lopano et al. |
| 2010/0253162 A1 | 10/2010 | Sakamaki et al. |
| 2010/0327709 A1* | 12/2010 | Minato .................... H05K 1/18 361/736 |
| 2011/0043057 A1 | 2/2011 | Ota |
| 2011/0079408 A1 | 4/2011 | Grunwald et al. |
| 2011/0171887 A1 | 7/2011 | Tanimoto et al. |
| 2011/0180286 A1 | 7/2011 | Oomori et al. |
| 2011/0227430 A1* | 9/2011 | Omori .................... H02K 11/33 310/50 |
| 2012/0037392 A1 | 2/2012 | Ikuta et al. |
| 2012/0098379 A1 | 4/2012 | Yamaguchi |
| 2012/0286593 A1 | 11/2012 | Yokogawa et al. |
| 2012/0319508 A1* | 12/2012 | Oomori .................... B25B 21/02 310/50 |
| 2013/0032010 A1 | 2/2013 | Lopano et al. |
| 2013/0033134 A1 | 2/2013 | Naito et al. |
| 2013/0090045 A1 | 4/2013 | Meyer |
| 2013/0126198 A1 | 5/2013 | Campbell et al. |
| 2013/0162098 A1 | 6/2013 | Furuhashi et al. |
| 2013/0207491 A1 | 8/2013 | Hatfield et al. |
| 2014/0139055 A1 | 5/2014 | Oomori et al. |
| 2014/0174776 A1 | 6/2014 | Grunwald et al. |
| 2014/0182869 A1* | 7/2014 | Kumagai .................. B25F 5/02 173/93 |
| 2014/0338947 A1 | 11/2014 | Boeck et al. |
| 2015/0014013 A1 | 1/2015 | Boeck et al. |
| 2015/0034348 A1 | 2/2015 | Yoshida et al. |
| 2015/0069864 A1* | 3/2015 | Nagahama ............. H02K 29/08 310/50 |
| 2015/0180307 A1* | 6/2015 | Inuzuka .................. B25F 5/008 310/50 |
| 2015/0188376 A1* | 7/2015 | Yamaguchi ............... H02K 3/28 310/71 |
| 2015/0263592 A1* | 9/2015 | Kawakami ............. H02K 29/06 451/359 |
| 2015/0280532 A1* | 10/2015 | Mizutani .................. B25F 5/00 310/50 |
| 2016/0294254 A1* | 10/2016 | Hara ....................... F16H 21/18 |
| 2017/0214292 A1* | 7/2017 | Nagahama ............. H02K 3/522 |
| 2017/0317548 A1* | 11/2017 | Suzuki .................... B23D 47/12 |
| 2018/0205288 A1 | 7/2018 | Nagahama et al. |
| 2019/0006909 A1* | 1/2019 | Nagahama ............. H02K 7/145 |
| 2019/0103784 A1* | 4/2019 | Kamada .................. H02K 11/02 |
| 2019/0375079 A1* | 12/2019 | Kamiya .................. B25D 16/003 |
| 2021/0283762 A1* | 9/2021 | Kusumoto ............... B25F 5/008 |
| 2022/0006347 A1* | 1/2022 | Fujii ....................... H02K 5/04 |
| 2022/0006362 A1* | 1/2022 | Fujii ..................... H02K 11/21 |

FOREIGN PATENT DOCUMENTS

| | | |
|---|---|---|
| DE | 102008006399 A1 | 8/2008 |
| EP | 2139098 A2 | 12/2009 |
| JP | S5524748 U | 2/1980 |
| JP | S5990124 U | 6/1984 |
| JP | H06233483 A | 8/1994 |
| JP | 2000317904 A | 11/2000 |
| JP | 2001150366 A | 6/2001 |
| JP | 2002136780 A | 5/2002 |
| JP | 2002270066 A | 9/2002 |
| JP | 2004016272 A | 1/2004 |
| JP | 2005341640 A | 12/2005 |
| JP | 2007175833 A | 7/2007 |
| JP | 2007330065 A | 12/2007 |
| JP | 2010273525 A | 12/2010 |
| JP | 2012139749 A | 7/2012 |
| JP | 2012239380 A | 12/2012 |
| JP | 2012245614 A | 12/2012 |
| JP | 2013021824 A | 1/2013 |
| JP | 2013107171 A | 6/2013 |
| JP | 2013110962 A | 6/2013 |
| JP | 2013226617 A | 11/2013 |
| JP | 2013237105 A | 11/2013 |
| JP | 2014037037 A | 2/2014 |
| JP | 2014124728 A | 7/2014 |
| WO | 2009135338 A1 | 11/2009 |
| WO | 2009145205 A1 | 12/2009 |
| WO | 2011155327 A1 | 12/2011 |
| WO | 2013161444 A1 | 10/2013 |

* cited by examiner

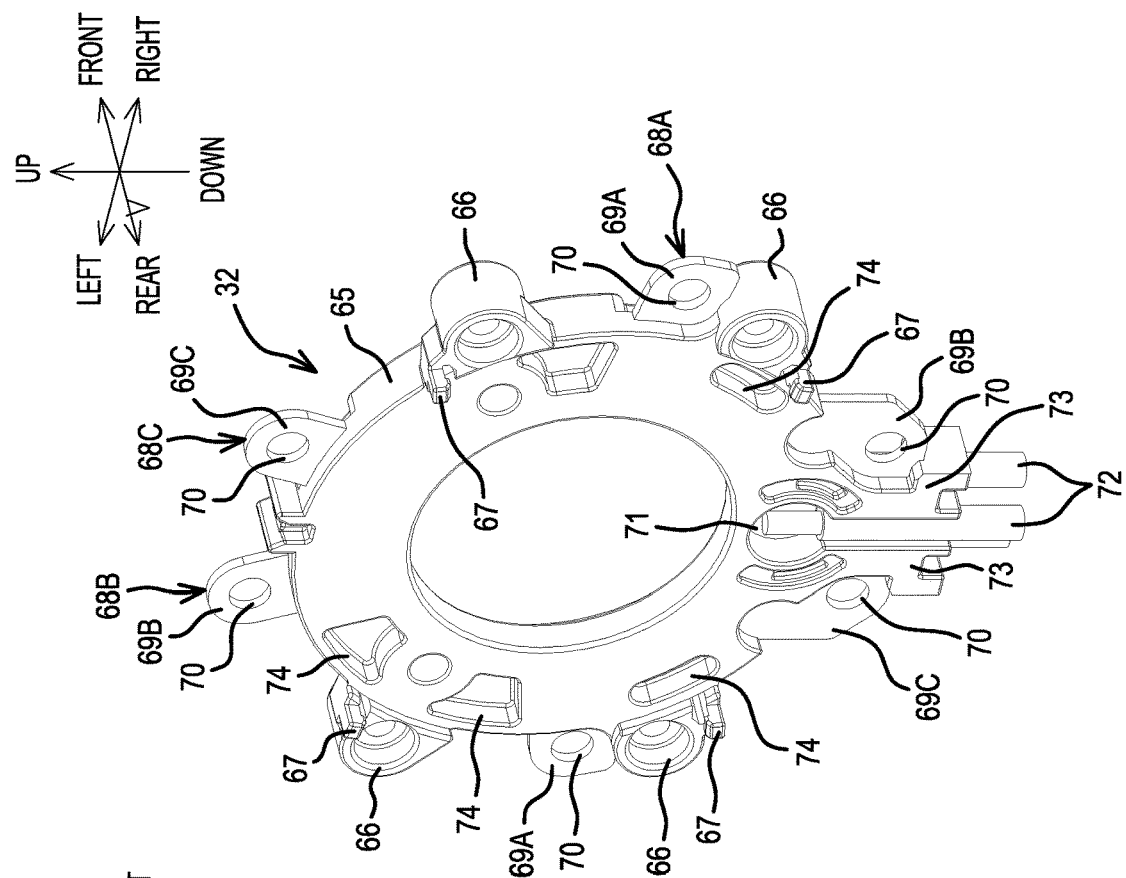
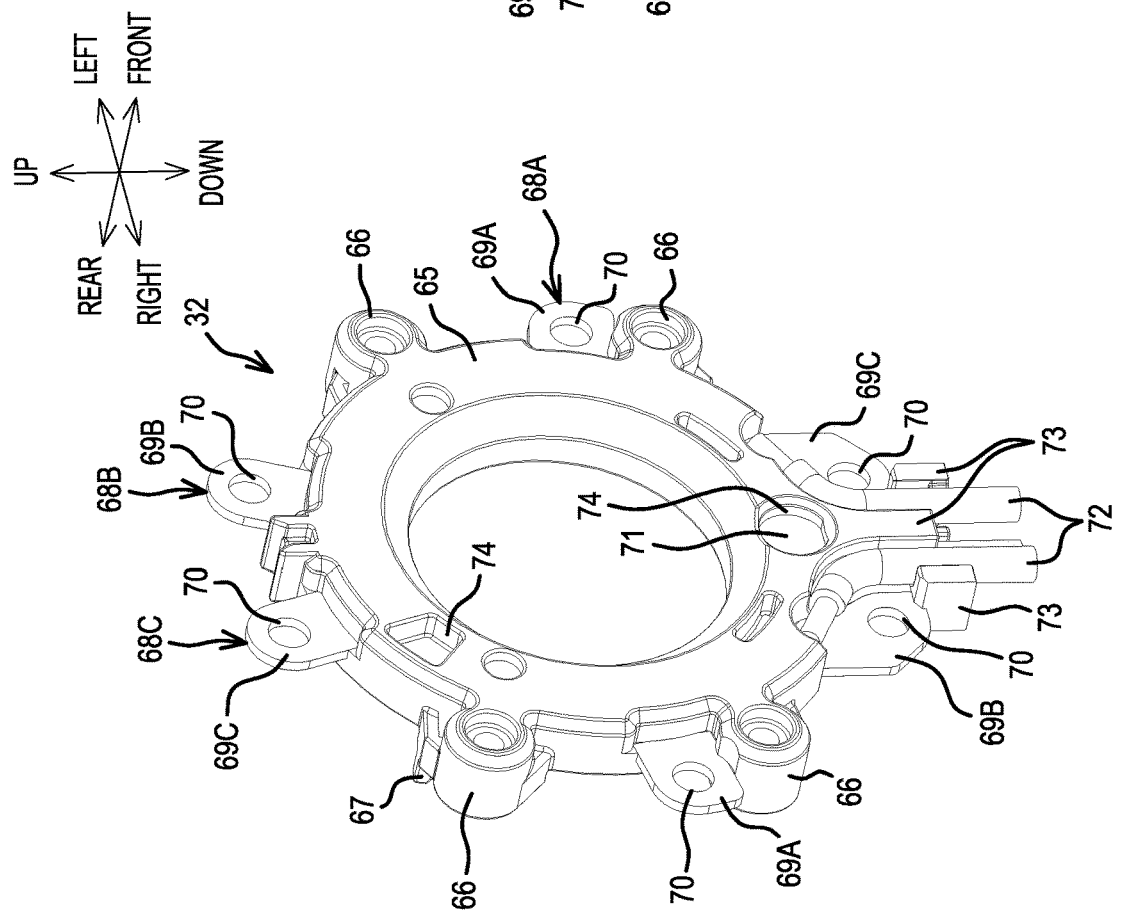

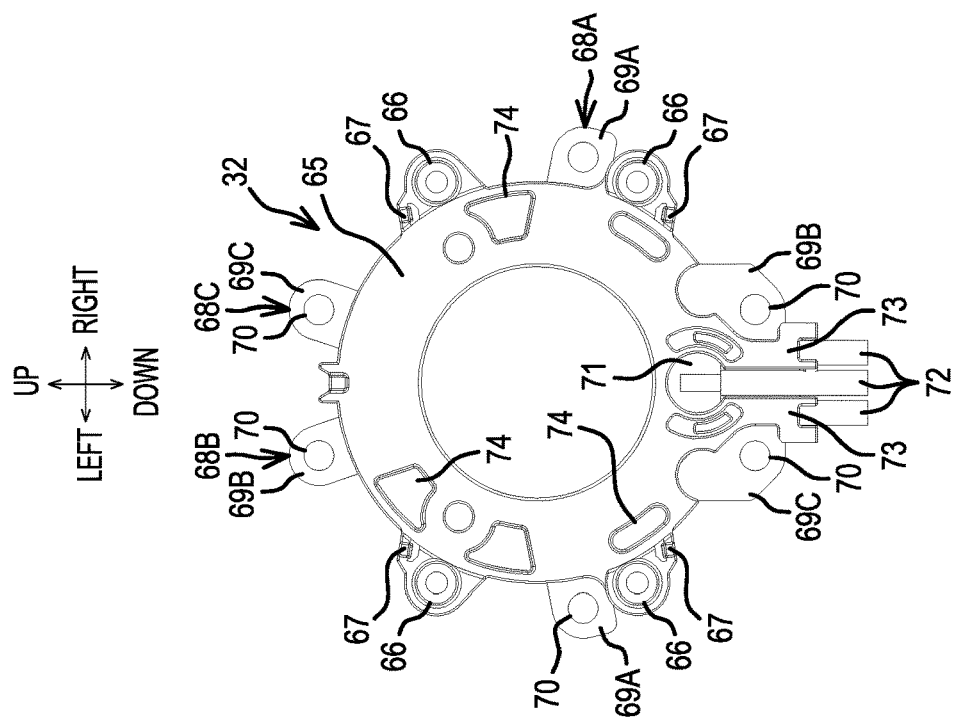
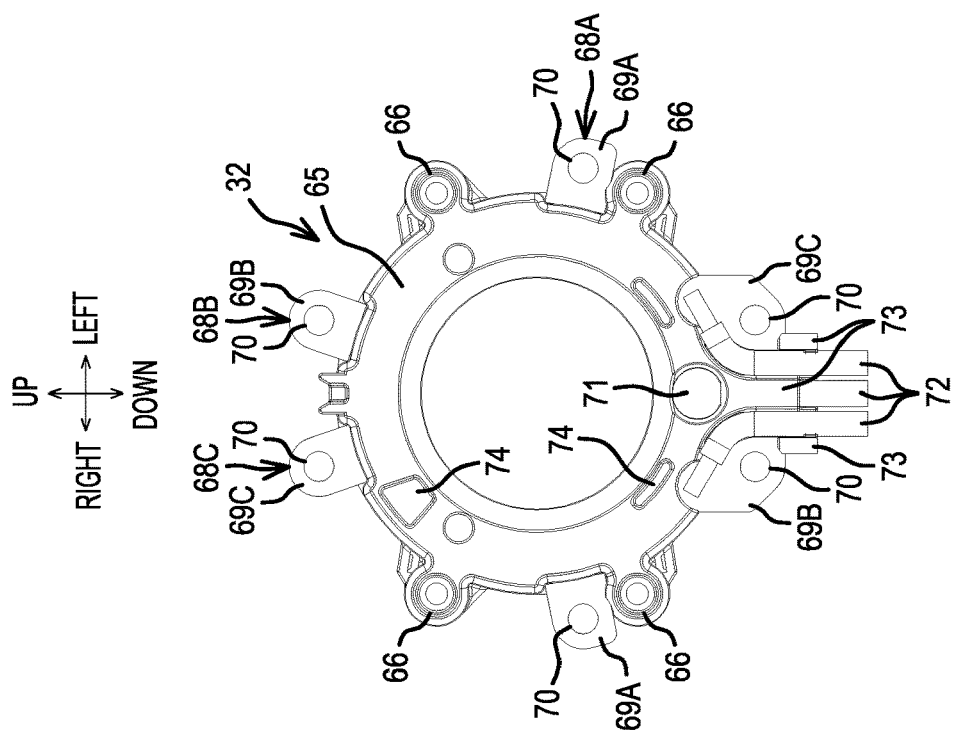

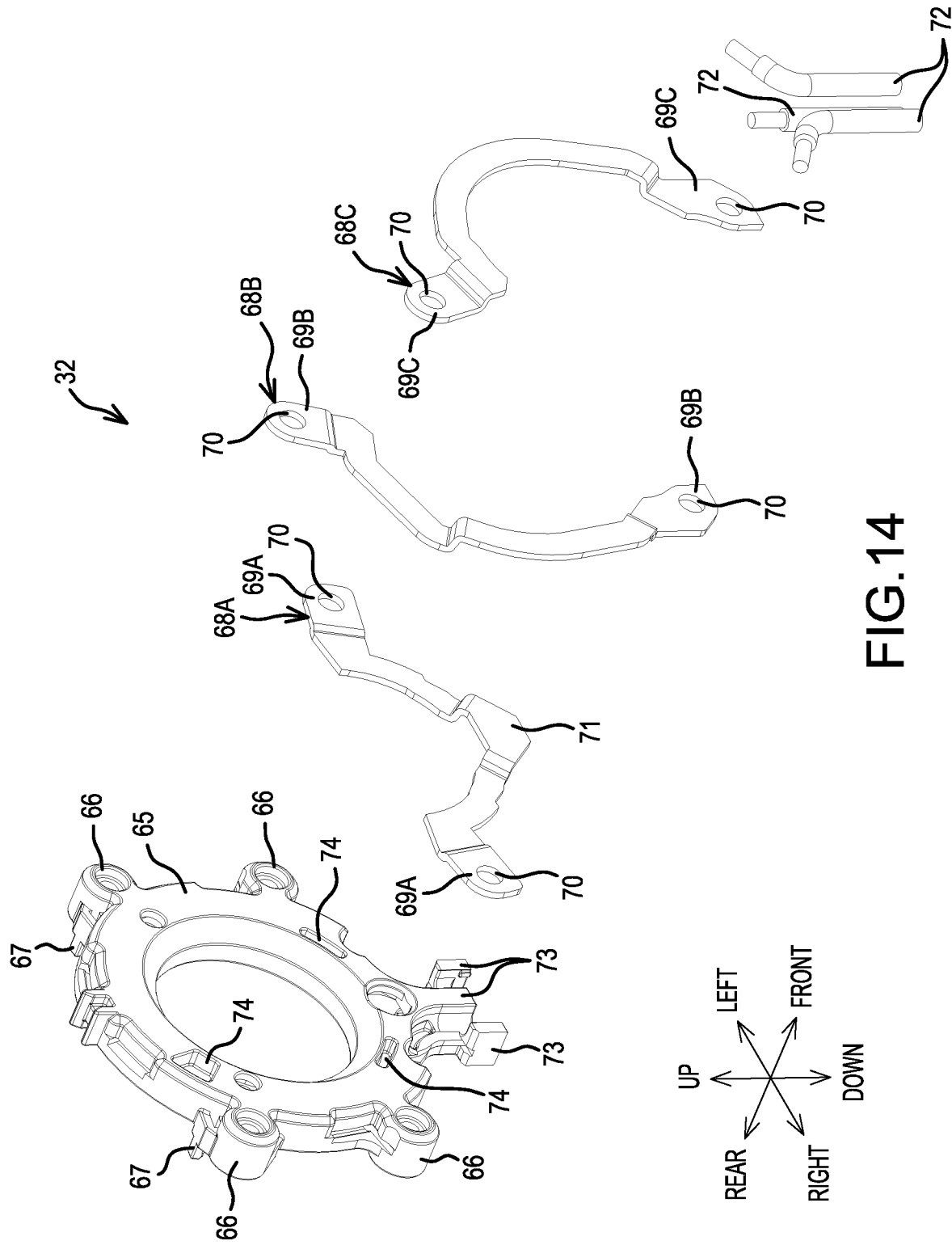

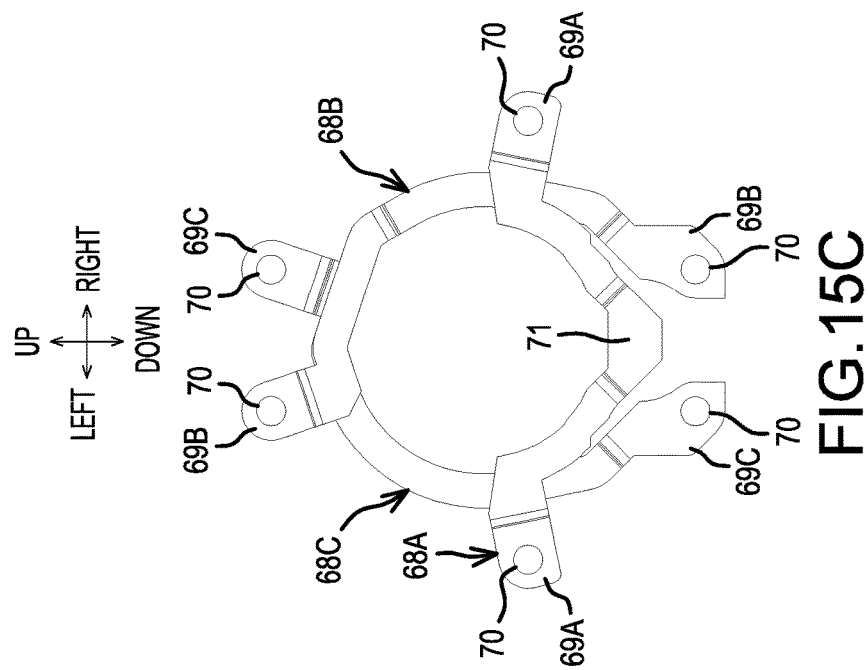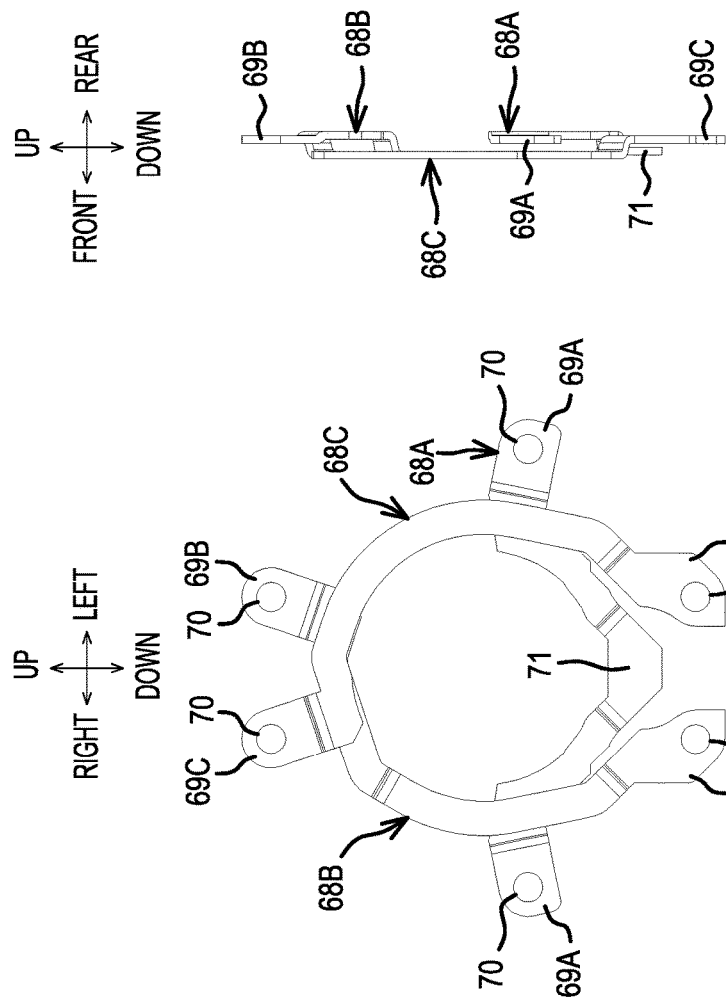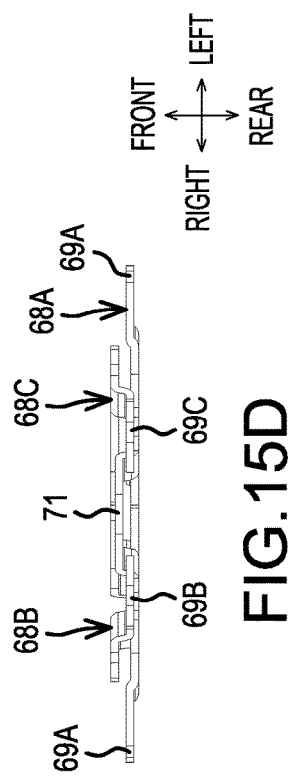

ELECTRIC MOTOR AND METHOD OF MANUFACTURING SUCH AN ELECTRIC MOTOR

CROSS-REFERENCE

The present application claims priority to Japanese patent application serial number 2018-234697 filed on Dec. 14, 2018, the contents of which are incorporated fully herein by reference.

TECHNICAL FIELD

The present invention relates to an electric motor, and to a method of manufacturing a stator for such an electric motor.

BACKGROUND ART

Some known electric work machines, such as power tools and gardening tools, utilize a brushless motor that serves as a drive source. For example, US 2018/0205288 discloses an advantageous brushless motor that can be energized using a relatively large current even though the stator is relatively compact and space-saving. In this known brushless motor, fusing terminals are fused to portions of a winding wire between the coils of the stator and are attached to the stator. A short-circuiting member having three embedded sheet-metal members, to which power-supply lines from a controller are respectively connected, is used to short-circuit (connect) respective pairs of portions of the winding wire between the coils. More specifically, the short-circuiting member is mounted on the stator; terminals of the three sheet-metal members embedded therein are respectively connected to the fusing terminals.

SUMMARY OF THE INVENTION

The above-described known brushless motor provides a highly advantageous design, but it can be further improved. In particular, it is noted that the fusing terminals are connected to the terminals of the short-circuiting member by soldering, which is prone to manufacturing variability and typically is visually inspected to determine the quality of the connection.

Moreover, to repair one of the stator or the controller, the solder must be first removed or both the stator and the controller must be removed and disconnected, which is labor-intensive and time-consuming.

Accordingly, it is one non-limiting object of the present teachings to disclose techniques for making it more simple to physically and electrically connect and disconnect a stator and a controller, thereby improving manufacturability and repairability of an electric work machine, such as a power tool, etc., that utilizes such a brushless motor.

In one aspect of the present teachings, an electric work machine may comprise a motor having a stator and a rotor. The stator may comprise: a stator core; an insulator held on the stator core; a plurality of coils wound through (around) the insulator and on the stator core; a plurality of coil terminals held by the insulator and respectively connected to the coils; and a short-circuiting member having a plurality of lead-wire terminals that are respectively connectable to the coil terminals. The coil terminals and the lead-wire terminals are respectively electrically connected by virtue of the short-circuiting member being attachably and detachably fixed to the insulator by screws.

In another aspect of the present teachings, the short-circuiting member may be fixed (physically attached) to the insulator by virtue of the coil terminals and the lead-wire terminals being connected by the screws.

In another aspect of the present teachings, the short-circuiting member may comprise an insulation part, which is made of a resin (polymer) and holds the plurality of lead-wire terminals. The insulation part optionally may be fixed (physically attached) to the insulator by one or more second screws.

In another aspect of the present teachings, the rotor is disposed in the interior of the stator core. Furthermore, a sensor circuit board that detects the position(s) of one or more permanent magnets provided on or in the rotor may be fixed (physically attached), by the second screw(s), between the insulator and the short-circuiting member.

In another aspect of the present teachings, an electric work machine may comprise: a motor comprising a stator and a rotor. The stator may comprise: a stator core; an insulator held by the stator core; a coil wound through (around) the insulator and on the stator core; a coil terminal held by the insulator, connected to the coil, and having a female thread formed therein; and a lead-wire terminal that is connectable to the coil terminal. The coil terminal and the lead-wire terminal are electrically connected by virtue of the lead-wire terminal being fixed to the coil terminal by a screw that is screwed into the female thread.

In another aspect of the present teachings, the female thread may be formed integrally with the coil terminal.

In another aspect of the present teachings, a method of manufacturing a stator in an electric-work-machine motor having a stator and a rotor may comprise: winding a winding wire to form a coil while an insulator is held on a stator core of the stator; fusing a portion of the winding wire to (in) a coil terminal held by the insulator; and electrically connecting a lead-wire terminal and the coil terminal by screw-connecting the lead-wire terminal, to which a lead wire is connected, to the coil terminal.

In another aspect of the present teachings, the coil terminal may have an integral female thread for use in the screw-connection to the lead-wire terminal.

Thus, in one advantage of the present teachings, variations in the manufactured products can be reduced by electrically connecting the coil terminals with the lead-wire terminals using a screw-connection, instead of, e.g., soldering. Moreover, the work (assembly) time is also shortened. In another advantage of the present teachings, because the stator can be disconnected from the controller by simply removing the screw(s), the product is easier to repair, because it is possible to remove and repair just one of them without having to remove the other.

BRIEF DESCRIPTION OF THE DRAWINGS

FIGS. 12A-B are oblique views of a short-circuiting member of the brushless motor, in an oblique view from the front, and in an oblique view from the rear, respectively.

FIGS. 13A-C are explanatory diagrams of the short-circuiting member, in a front view, in a side view, and in a rear view, respectively.

FIG. 14 is an exploded oblique view of the short-circuiting member.

FIGS. 15A-D are explanatory diagrams of first to third sheet-metal members of the short-circuiting member, in a front view, in a side view, in a rear view, and in a bottom view, respectively.

DETAILED DESCRIPTION OF THE EMBODIMENTS

Embodiments of the present teachings are explained below, with reference to the drawings.

Overall Explanation of Driver Drill

Figure 1:
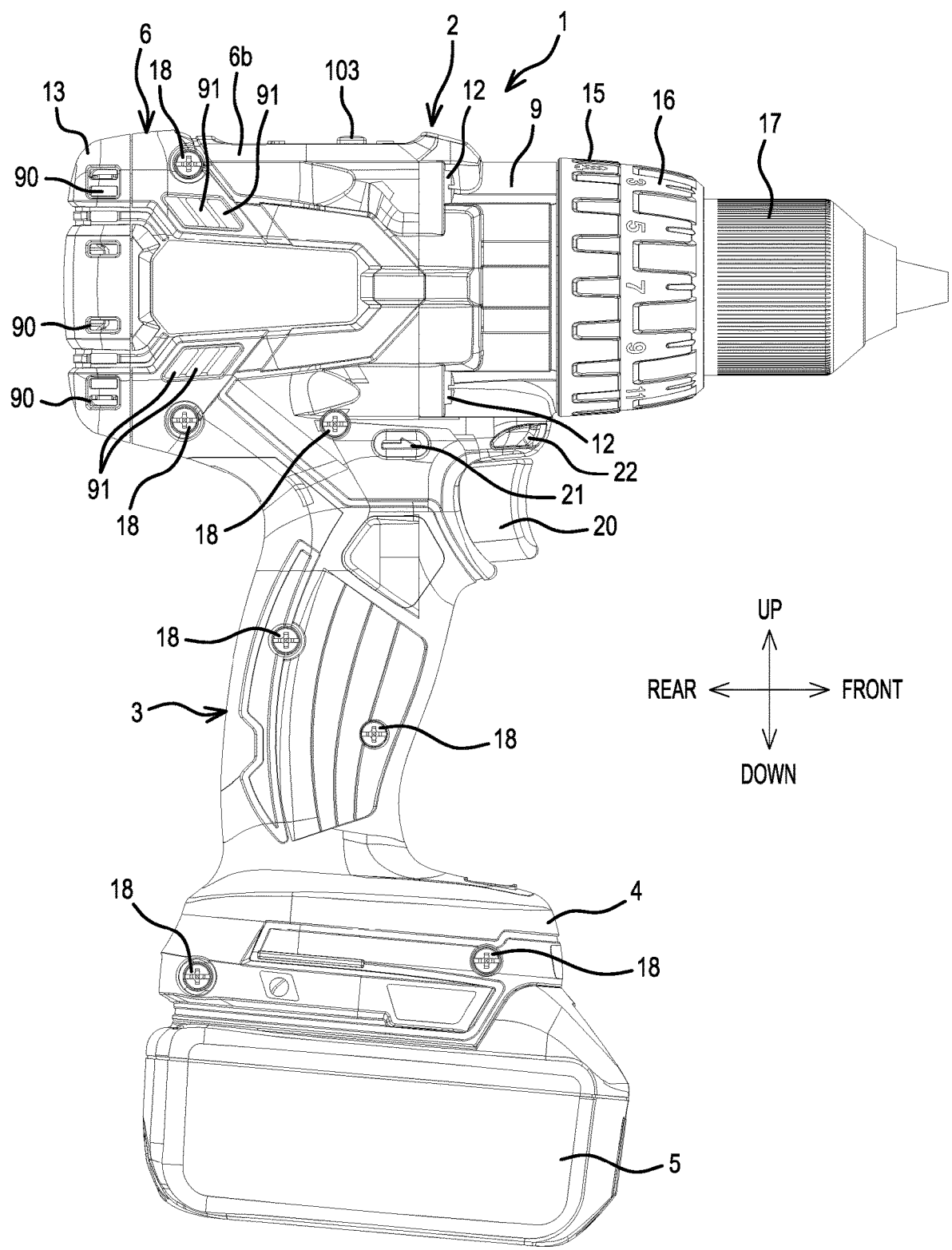
FIG. 1 is an overall view of a driver drill according to one embodiment of the present teachings.
Figure 2:
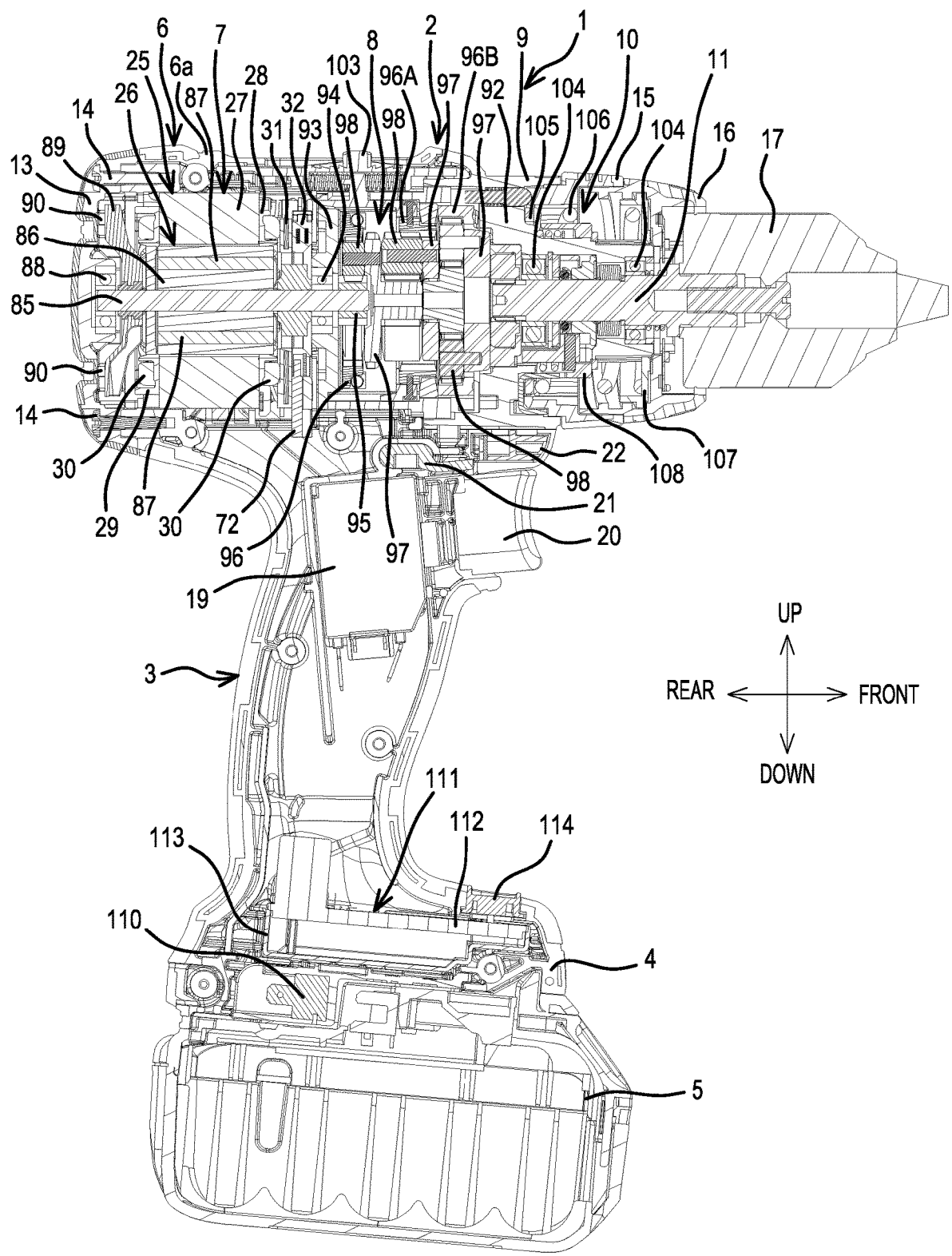
FIG. 2 is a center, longitudinal, cross-sectional view of the driver drill.

FIG. 1 is an overall view of a rechargeable driver drill 1, which is one representative, non-limiting example of an electric work machine according to the present teachings, and FIG. 2 is a center, longitudinal, cross-sectional view thereof. The driver drill 1 has a T shape, in which a handle 3 extends downward from a main-body part 2, which extends in a front-rear direction. A battery pack 5, which constitutes a power supply, is mounted on a battery-mount part 4, which is formed on a lower end of the handle 3.

A housing of the main-body part 2 is formed by: assembling a front housing 9, which houses a clutch mechanism 10 and a spindle 11 forward of a tubular main-body housing 6 that houses a brushless motor 7 and a planetary-gear, speed-reducing mechanism 8, using screws 12 that are screwed in from the front; and assembling a rear cover 13 rearward of the main-body housing 6 using screws 14 at two locations (upper and lower), that are screwed in from the rear.

A mode-changing ring 15 and a clutch-adjusting ring 16 are provided forward of the front housing 9. A chuck 17 is fixed forward of the clutch-adjusting ring 16 and coaxially with a front end of the spindle 11. The handle 3 is continuous with the main-body housing 6, and these are formed by assembling left and right half housings 6a, 6b together using screws 18. A switch 19, from which a trigger 20 protrudes forward, is housed in an upper part of the handle 3, and a motor-rotation forward/reverse-switch button (reversing switch lever) 21 is provided on an upper side of the switch 19. A light 22 comprises an LED that illuminates forward of the chuck 17 and is provided upward of the trigger 20.

Explanation of a Representative Brushless Motor

The brushless motor 7 is housed in a rear portion of the main-body housing 6, and is an inner-rotor type that comprises a stator 25 and a rotor 26. As shown in FIGS. 3-6, the stator 25 comprises: a stator core 27, which has a tube shape and is formed from a plurality of laminated steel sheets; a first insulator 28 and a second insulator 29, which are provided on the front and rear end surfaces, respectively, of the stator core 27 in the axial direction; and six coils 30, which are wound through the first and second insulators 28, 29 and on teeth 33 of the stator core 27.

In the present embodiment, the first insulator 28 is disposed on a front side of the motor 7, and a sensor circuit board 31 and a short-circuiting member 32 are mounted on the first insulator 28.

Figure 7:
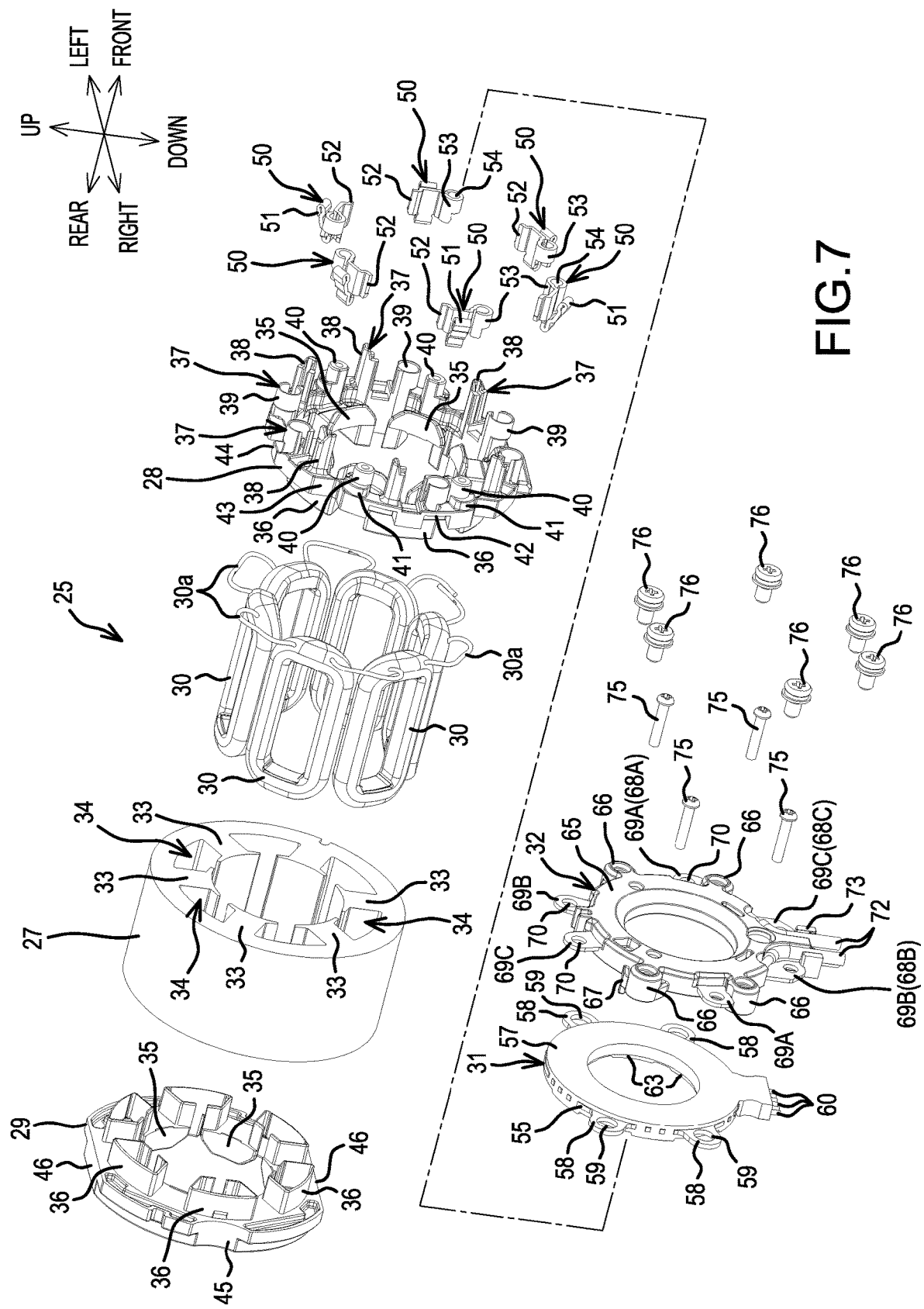
FIG. 7 is an exploded oblique view of the stator.

Referring now to FIG. 7, the stator core 27 comprises six teeth 33, which protrude toward the axial-center side, i.e. radially inward. Six slots 34 are respectively formed between adjacent pairs of the teeth 33.

Figure 8A:
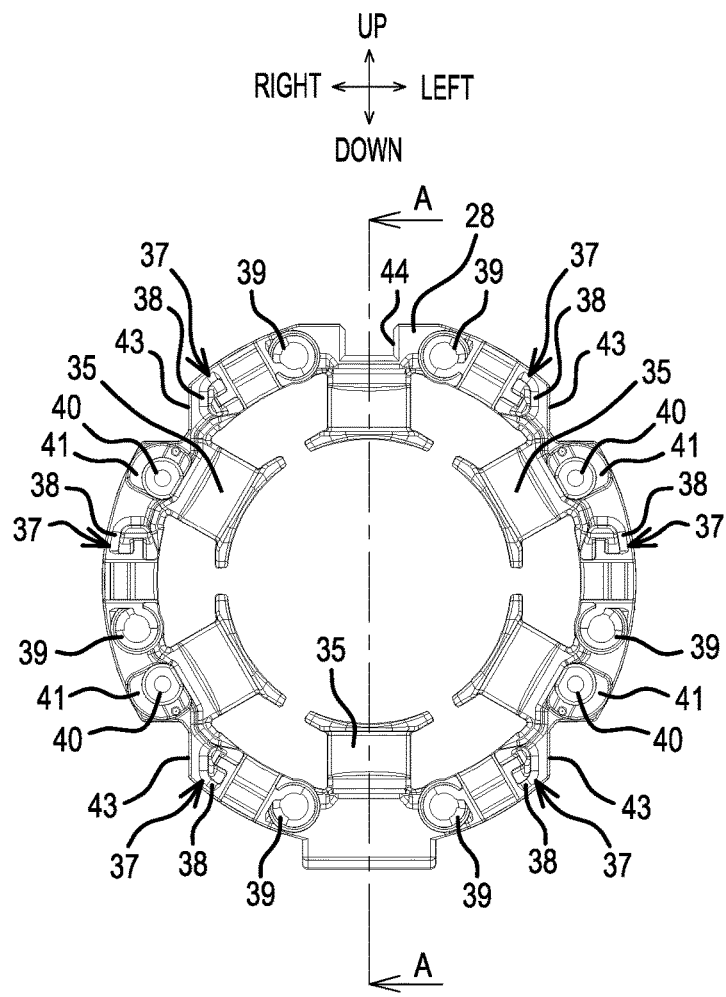
FIGS. 8A-C are explanatory diagrams of a first insulator of the stator, in a front view, a bottom view, and a cross-sectional view taken along line A-A in FIG. 8A, respectively.
Figure 8C:
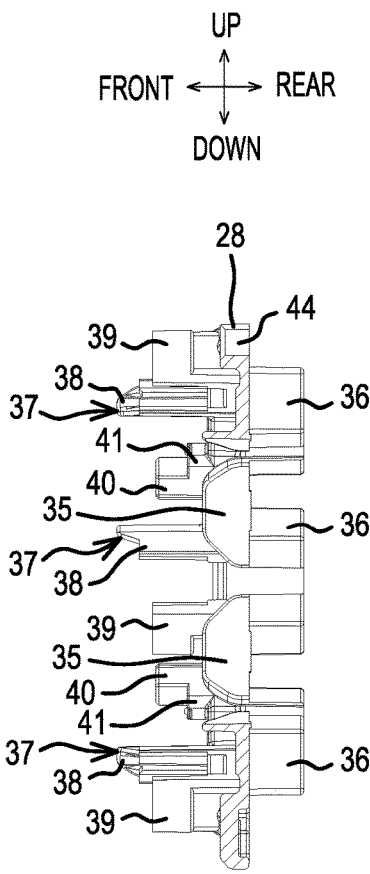
Figure 8B:
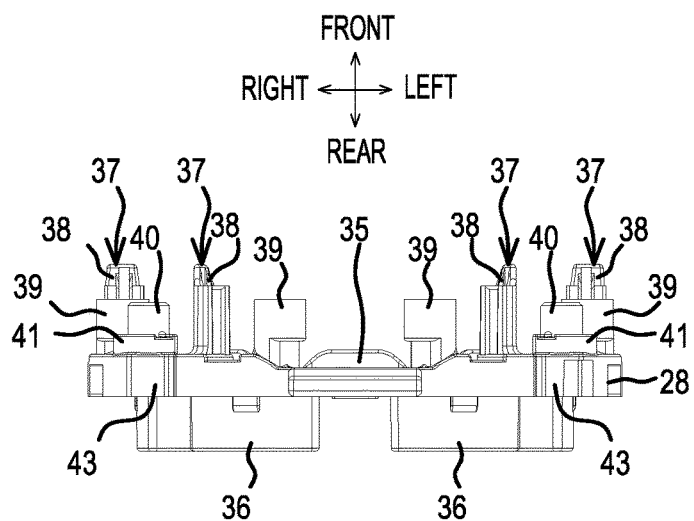

As shown also in FIGS. 8A-C, the first insulator 28 is a ring-shaped, integrally molded article whose diameter is the same as that of the stator core 27. Six coil-winding protrusions 35 protrude toward the axial-center side (radially inward) from an inner-circumferential surface of the first insulator 28 and are respectively located forward of the teeth 33 of the stator core 27. In addition, six mating parts 36 project from a rear surface of the first insulator 28 and respectively mate with the slots 34 of the stator core 27. Six sets of retaining parts 37 for respectively retaining fusing terminals 50 (described below) project from the front surface of the first insulator 28 on the outer-circumference side at locations that correspond to the mating parts 36. Each of the retaining parts 37 includes a first projection 38, which has a U shape in front view, and a second projection 39, which has a C shape in front view. The first projection 38 and the second projection 39 are disposed at a prescribed spacing (separated by a prescribed distance) such that the openings of the U shape and the C shape oppose one another. Four screw bosses 40, which each have a screw hole in its center and a flange part 41 that extends from the base of the first insulator 28, are provided so as to respectively project, in pairs, one above and one below and separated left and right, between the retaining parts 37.

Figure 4:
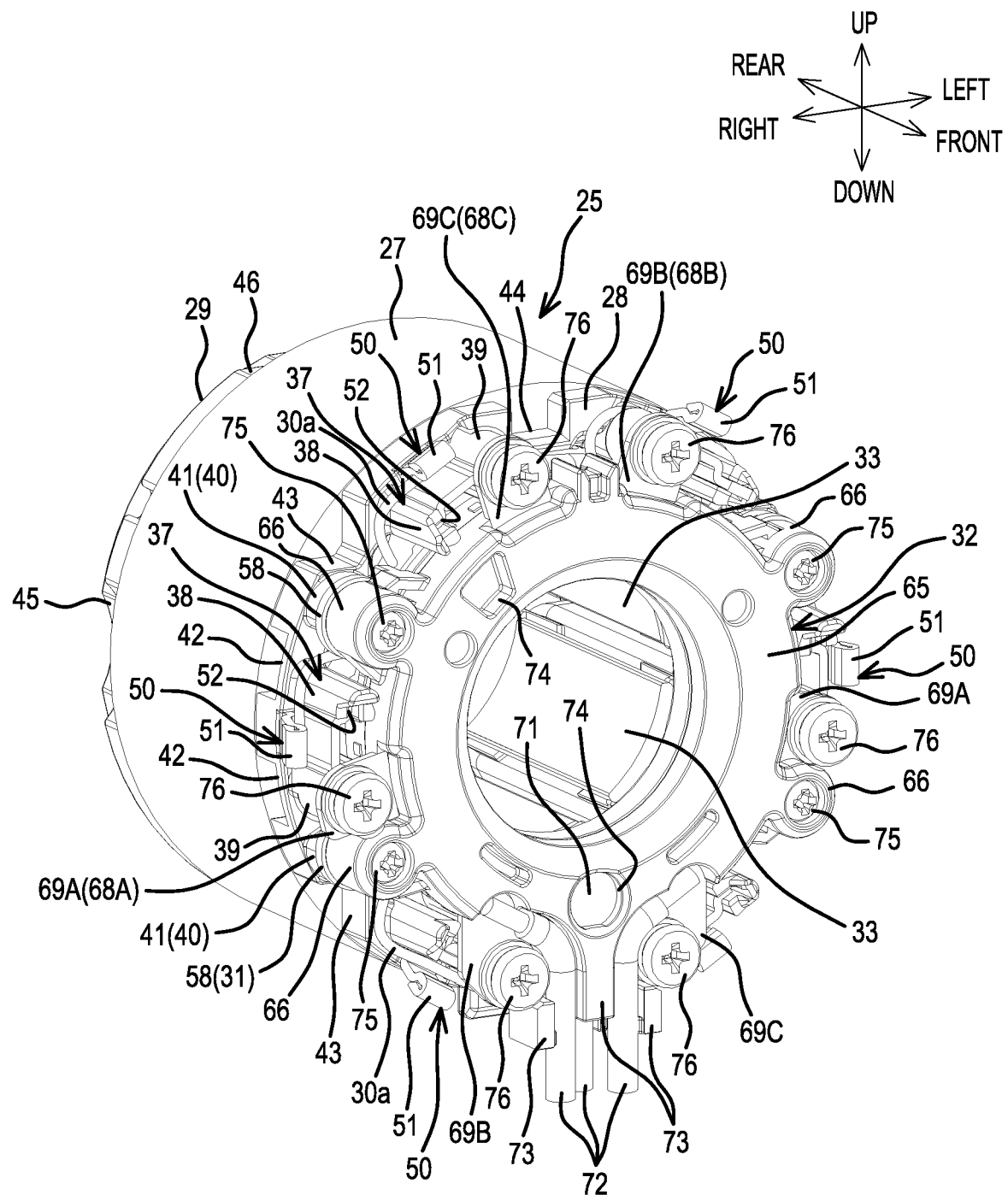
FIG. 4 is an oblique view of a stator, viewed from the front, of the brushless motor of FIG. 3.

As can be best seen in FIGS. 4 and 7, a pair of recesses 42 is formed in each of the left and right side parts of the first insulator 28. In addition, a pair of triangular first notches 43 is formed on the upper and lower sides of each pair of recesses 42 such that each pair of first notches 43 sandwich one pair of recesses 42. Furthermore, a quadrangular second notch 44 is formed in the center of an upper part of the first insulator 28.

Figure 5:
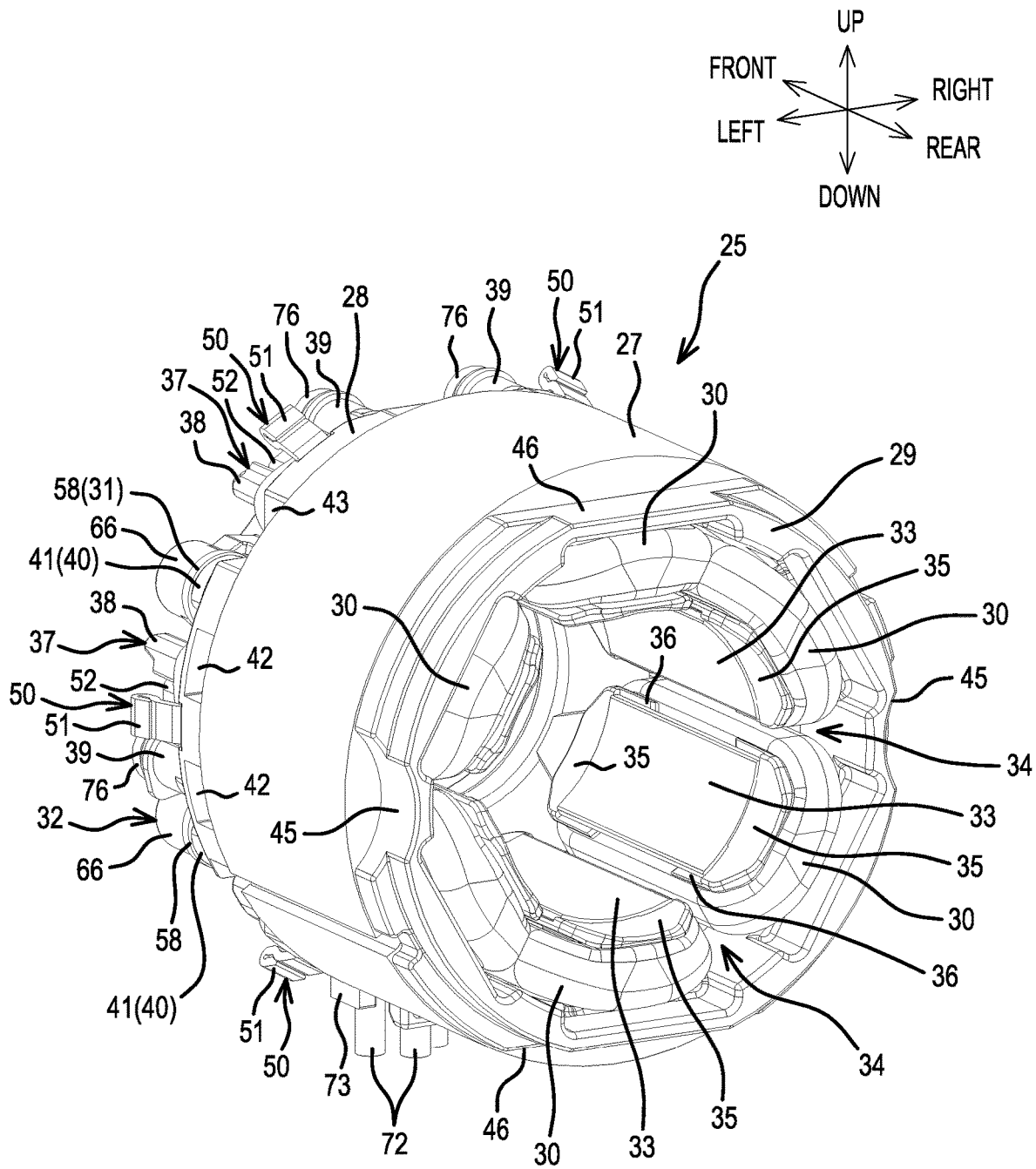
FIG. 5 is an oblique view of the stator, viewed from the rear.
Figure 6:
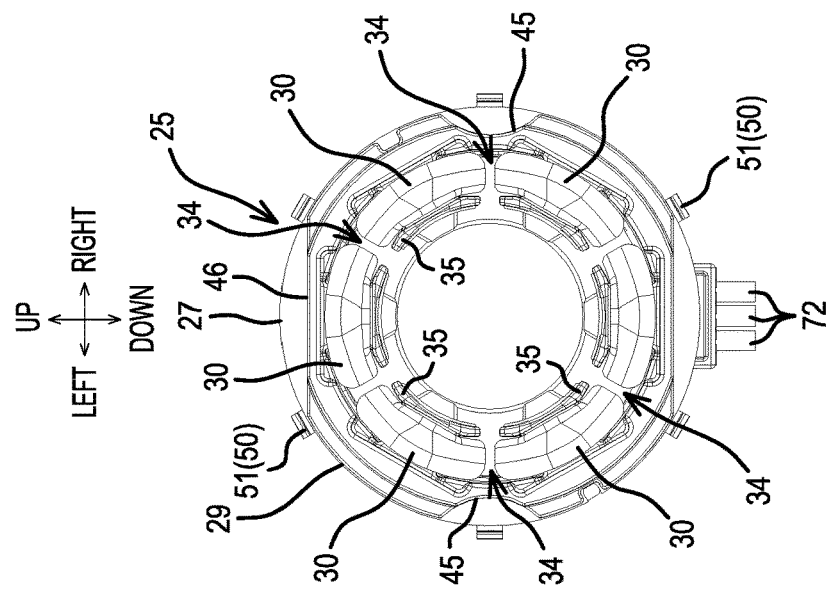
FIGS. 6A-C are explanatory diagrams of the stator, in a front view, a side view, and a rear view, respectively.

Referring now to FIGS. 5 and 7, the second insulator 29 also has a ring shape and has the same diameter as that of the stator core 27. Similar to the first insulator 28, six coil-winding protrusions 35 protrude toward the axial-center side (radially inward) from an inner-circumferential surface of the second insulator 29 and are respectively located rearward of the teeth 33 of the stator core 27. In addition, six mating parts 36 project from a front surface of the second insulator 29 and respectively mate with the slots 34 of the stator core 27. Furthermore, curved transverse notches 45, 45 are formed on the left and right sides of the second insulator 29, and bevels 46, which are notched in a straight line, are formed at the centers of the upper and lower portions of the second insulator 29.

Figure 9A:
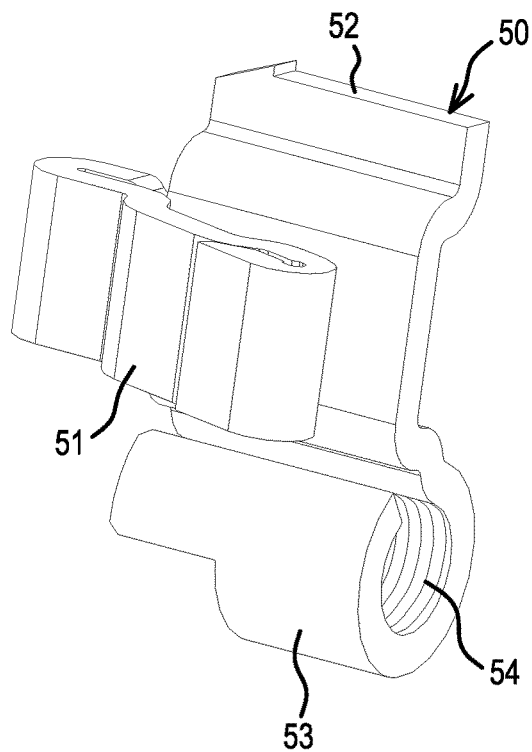
FIGS. 9A-B are oblique views of a fusing terminal of the stator, in an oblique view from a sandwiching-piece side, and in an oblique view from the opposite side, respectively.
Figure 9B:
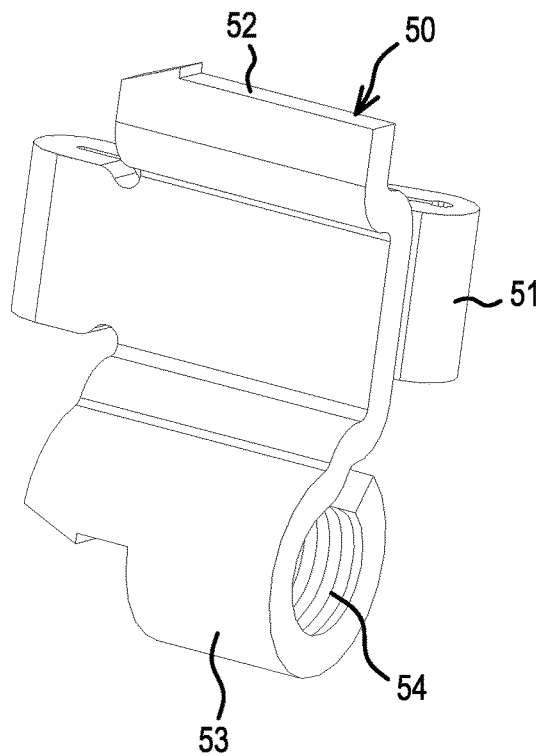
Figure 10C:
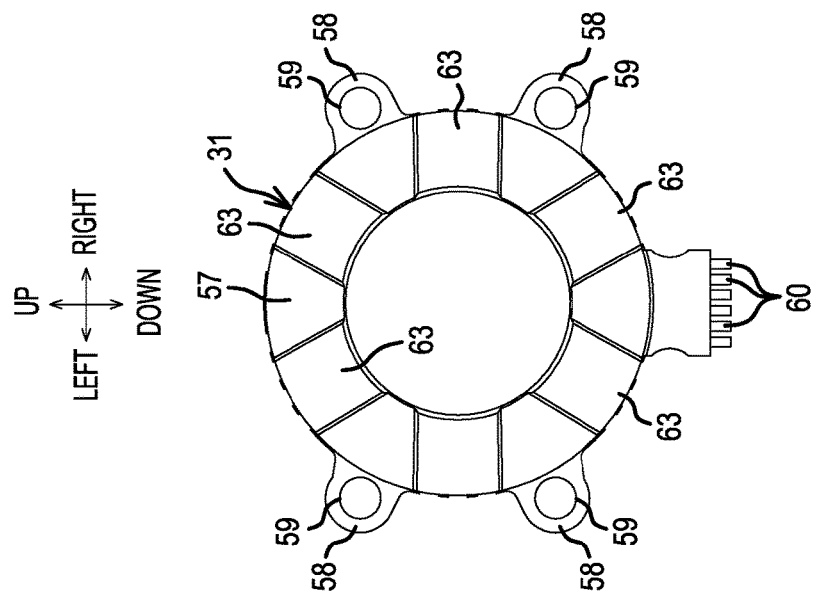
FIGS. 10A-D are explanatory diagrams of a sensor circuit board of the brushless motor, in a front view, a side view, a rear view, and a bottom view, respectively.
Figure 10B:
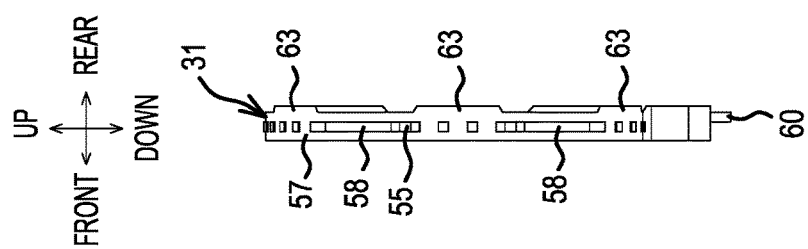
Figure 10A:
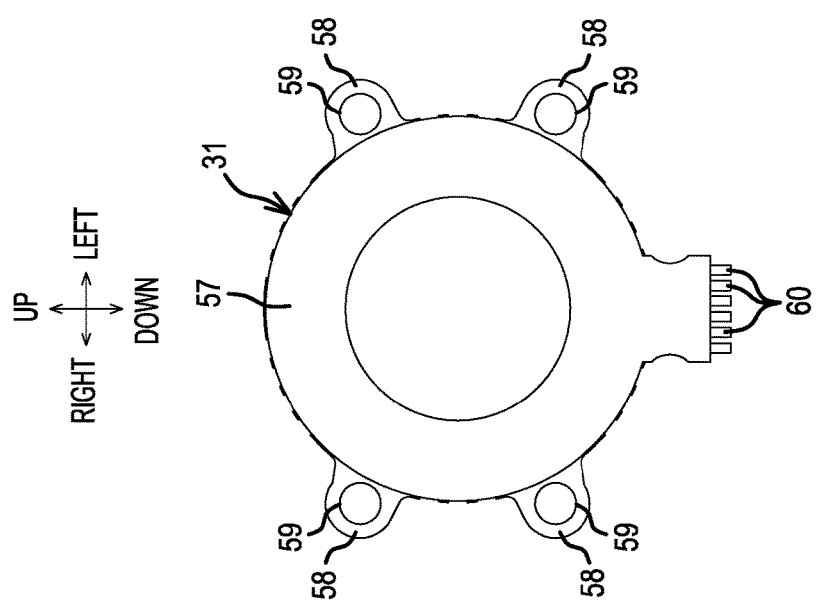
Figure 10D:
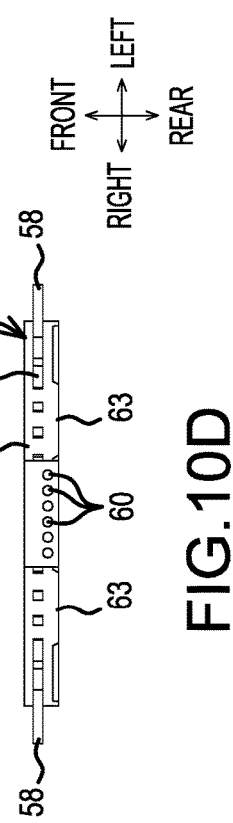
Figure 11:
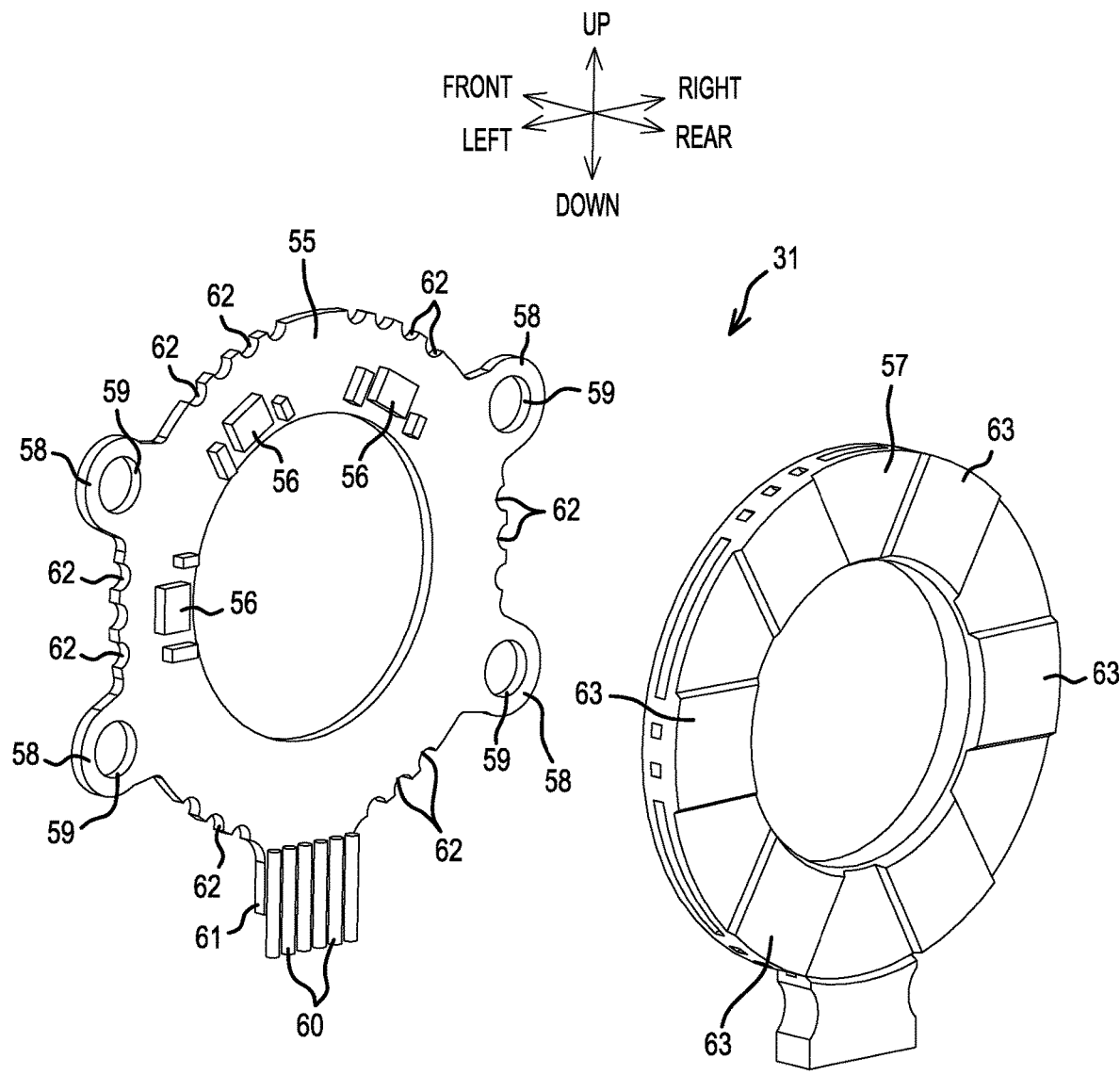
FIG. 11 is an exploded oblique view of the sensor circuit board.

As can be seen in FIGS. 4-7, the fusing terminals 50 are respectively retained by the retaining parts 37 of the first insulator 28. As shown in more detail in FIG. 9, each fusing terminal 50 is made of metal and comprises a sandwiching piece 51, which is a strip-shaped metal fitting that has been folded twice and is designed to be heated and fused with (to) a magnet wire 30a (winding wire) that forms the coils 30. Each fusing terminal 50 also includes an insertion piece 52 that is formed on one edge (end) of the strip-shaped metal fitting, and is designed to be inserted into the first projection 38 of the corresponding retaining part 37. On the opposite edge (end) of the strip-shaped metal fitting, a nut part 53 has a generally circular-cylindrical shape and is designed to be inserted into the second projection 39 of the corresponding retaining part 37. The nut part 53 is formed by curling a portion of the metal fitting into a C shape, and it has a female thread 54 formed on an inner circumference thereof.

Each fusing terminal 50 is oriented such that its sandwiching piece 51 faces the outer side in the radial direction (i.e. faces radially outward) when the insertion piece 52 is inserted into its corresponding first projection 38 and the nut part 53 is inserted into its corresponding second projection 39. Therefore, each fusing terminal 50 is held with an attitude such that it is parallel to the axial direction of the first insulator 28 and concentric therewith.

In the present embodiment, the coils 30 are respectively wound around the teeth 33 of the stator core 27 and around the respective protrusions 35 of the first and second insulators 28, 29. More particularly, a single (continuous) magnet wire 30a is wound sequentially around the teeth 33 that are adjacent in the circumferential direction. All the fusing terminals 50 are electrically connected (fused) to the magnet wire 30a, which provides connections between the coils 30, by looping the magnet wire 30a around the outer sides of the retaining parts 37 and sandwiching (interleaving, interposing) the magnet wire 30a in the sandwiching pieces 51 of the fusing terminals 50. Then, the sandwiching pieces 51 are heated to fuse them to the magnet wire 30a.

Referring now to FIGS. 10A-D and FIG. 11, the sensor circuit board 31 comprises: a board 55; three rotation-detection devices 56 installed on the board 55 and that detect the positions of permanent magnets 87 provided on the rotor 26 and output a rotation-detection signal; and a resin part (polymer layer) 57, which covers the board 55.

The board 55 has a doughnut shape having an outer diameter that fits within the inner side of the retaining parts 37. Four projections 58 extend radially outwardly from the outer circumference of the board 55, and respectively have through holes 59 corresponding to the screw bosses 40 of the first insulator 28. By inserting the screw bosses 40 through the through holes 59, the projections 58 come into contact with the flange parts 41 and are positioned on the front surface of the first insulator 28. A leader part 61 leads out all of signal lines 60 of the rotation-detection devices 56 and is provided at the center of a lower part of the board 55. A plurality of notches 62 is formed on (in) the outer circumference of the board 55, except at the projections 58 and the leader part 61.

In addition, the resin part 57 is insert-molded with the board 55, covers the leader part 61 and the front and rear of the board 55, except at the projections 58, and is thereby integrated (integral) with the board 55. The notches 62 of the board 55 are deeply inserted into the resin part 57, thereby increasing the strength with which the board 55 is coupled with the resin part 57. Four radially-extending thick-wall parts 63 are formed on a rear surface of the resin part 57, thereby increasing the stiffness of the sensor circuit board 31 and making it possible to differentiate the front of the sensor circuit board 31 from the rear of the sensor circuit board 31.

Referring now to FIGS. 12A-B and 13A-C, the short-circuiting member 32 includes four tubular bosses 66, which are designed to respectively mate with the screw bosses 40 of the first insulator 28. The tubular bosses 66 integrally project from the outer circumference of a ring-shaped, resin (polymer) insulation part 65, whose diameter is substantially the same as that of the sensor circuit board 31. Protruding pieces 67 rearwardly project from the base sides of the rear surfaces of the bosses 66, and are designed to coaxially hold the sensor circuit board 31 on the inner sides thereof.

In addition, as can be better seen in the exploded view of the short-circuiting member 32 shown in FIG. 14, three sheet-metal members (strips), namely, a first sheet-metal member 68A, a second sheet-metal member 68B, and a third sheet-metal member 68C, are insert-molded (partially embedded) in the insulation part 65 so that they do not contact each other. The first sheet-metal member 68A has a generally U shape with a pair of first short-circuiting pieces (lead-wire terminals) 69A, facing outward to the left and right, respectively formed on the left and right ends of the first sheet-metal member 68A. The second sheet-metal member 68B has a generally arcuate shape with a pair of second short-circuiting pieces (lead-wire terminals) 69B respectively formed on the lower right and the upper left of the second sheet-metal member 68B. The third sheet-metal member 68C also has a generally arcuate shape with a pair of third short-circuiting pieces (lead-wire terminals) 69C respectively formed on the lower left and the upper right of the third sheet-metal member 68C. Each of the short-circuiting pieces (lead-wire terminals) 69A-69C has a through hole 70 for receiving a screw 76, as will be further discussed below. The three sheet-metal members 68A-C may be formed, e.g., by bending metal strips, by stamping, etc.

As shown in FIGS. 15A-D, these three sheet-metal members 68A-68C are insert-molded (partially embedded) in the insulation part 65 such that the second sheet-metal member 68B is disposed forward of the first sheet-metal member 68A, the third sheet-metal member 68C is disposed forward of the first sheet-metal member 68A. Furthermore, the three sheet-metal members 68A-68C are disposed concentrically and partially overlap one another, but do not physically contact each other. Therefore, the three sheet-metal members (strips) 68A-68C are electrically isolated from each other by the resin (polymer) of the insulation part 65.

However, at the outer circumference of the insulation part 65, the six short-circuiting pieces (lead-wire terminals) 69A-69C are exposed because they radially project outward from the insulation part 65 (i.e. they are not embedded in the insulation part 65). Furthermore, the first short-circuiting pieces (lead-wire terminals) 69A are disposed diagonally opposite one another, the second short-circuiting pieces (lead-wire terminals) 69B are disposed diagonally opposite one another, and the third short-circuiting pieces (lead-wire terminals) 69C are disposed diagonally opposite one another. Furthermore, the six short-circuiting pieces (lead-wire terminals) 69A-C are circumferentially arranged (located) in correspondence with the locations of the fusing terminals 50 retained by the first insulator 28.

A connecting piece 71 of the first sheet-metal member 68A is located between the lower one the second short-circuiting pieces 69B and the lower one of the third short-circuiting pieces 69C. The connecting piece 71 includes a central portion that is bent toward the front side. U-phase, V-phase, and W-phase power-supply lines (lead wires) 72 are respectively spot welded to (i) the rear surface of the connecting piece 71, (ii) the lower front surface of the second short-circuiting piece 69B, and (iii) the lower front surface of the third short-circuiting piece 69C. Three vertically-extending (parallel) guide ribs 73 act as partitions between the power-supply lines 72 so as to guide the power-supply lines 72 downward away from the sheet-metal members 68A-68C and to retain the power-supply lines 72 in parallel on a lower-end rear surface of the insulation part 65.

In addition, exposing holes 74 are formed in the front and rear surfaces of the insulation part 65. The exposing holes 74 partially expose the sheet-metal members 68A-68C to facilitate heat-dissipation.

Explanation of a Representative Method for Manufacturing a Stator

In a representative method for manufacturing a stator according to the present teachings, the first and second insulators 28, 29 are formed and held on the stator core 27. Then, the coils 30 are sequentially wound, in a continuous manner, on (around) the teeth 33 on the stator core 27 and around the coil-winding protrusions 35 of the first and second insulators 28, 29 using a single winding wire (magnet wire) 30a. Portions of the magnet wire 30a between adjacent coils are respectively passed through the fusing terminals 50 that are retained by the retaining parts 37 on the first insulator 28.

Then, the portions of the magnet wire 30a between the adjacent coils 30 are respectively fused to the fusing terminals 50, thereby electrically connecting the fusing terminals 50 to the magnet wire 30a.

The rear surface of the short-circuiting member 32 is held on the sensor circuit board 31 by the protruding pieces 67, with the projections 58 aligned with the bosses 66 of the insulation part 65 and overlapping from the rear.

Next, four screws 75 are respectively inserted, from the front side, through the four bosses 66 of the short-circuiting member 32 and the four through holes 59 of the projections 58 of the sensor circuit board 31 and are then screwed into the four screw bosses 40 of the first insulator 28. As a result, the sensor circuit board 31 and the short-circuiting member 32 are affixed (physically connected) to the first insulator 28, as can be seen, e.g., in FIGS. 4 and 6.

Thereafter, six screws 76 are respectively inserted, from the front side, through the through holes 70 of the short-circuiting pieces 69A-69C, and are then respectively screwed into the female threads 54 of the nut parts 53 of the fusing terminals 50, whereby the short-circuiting pieces 69A-69C (and thus the short-circuiting members 68A-C) become conductive simultaneous with being fixed by the screws 76, by either bringing the short-circuiting pieces 69A-69C into direct contact with the respective nut parts 53 of the fusing terminals 50 or by serving as an electric conduit between the short-circuiting pieces 69A-69C and the respective nut parts 53 of the fusing terminals 50 (in case the screws 76 are electrically conductive), or by both direct contact of the short-circuiting pieces 69A-69C and the respective nut parts 53 of the fusing terminals 50 and by acting as an electrical conductor therebetween.

In such a manufacturing process, the stator 25 is formed such that three pairs of the fusing terminals 50, which are located with point symmetry (i.e. diametrically-opposite fusing terminals 50), are respectively short circuited by the first, second and third sheet-metal members 68A-68C. Thus, because the diametrically-opposite fusing terminals 50, which are each electrically connected to the respective portions of the magnet wire 30a between adjacent coils 30, which are sequentially wound around the stator core 27, are respectively electrically interconnected by the first, second and third sheet-metal members 68A-68C, a so-called parallel-winding delta connection is formed.

Figure 3:
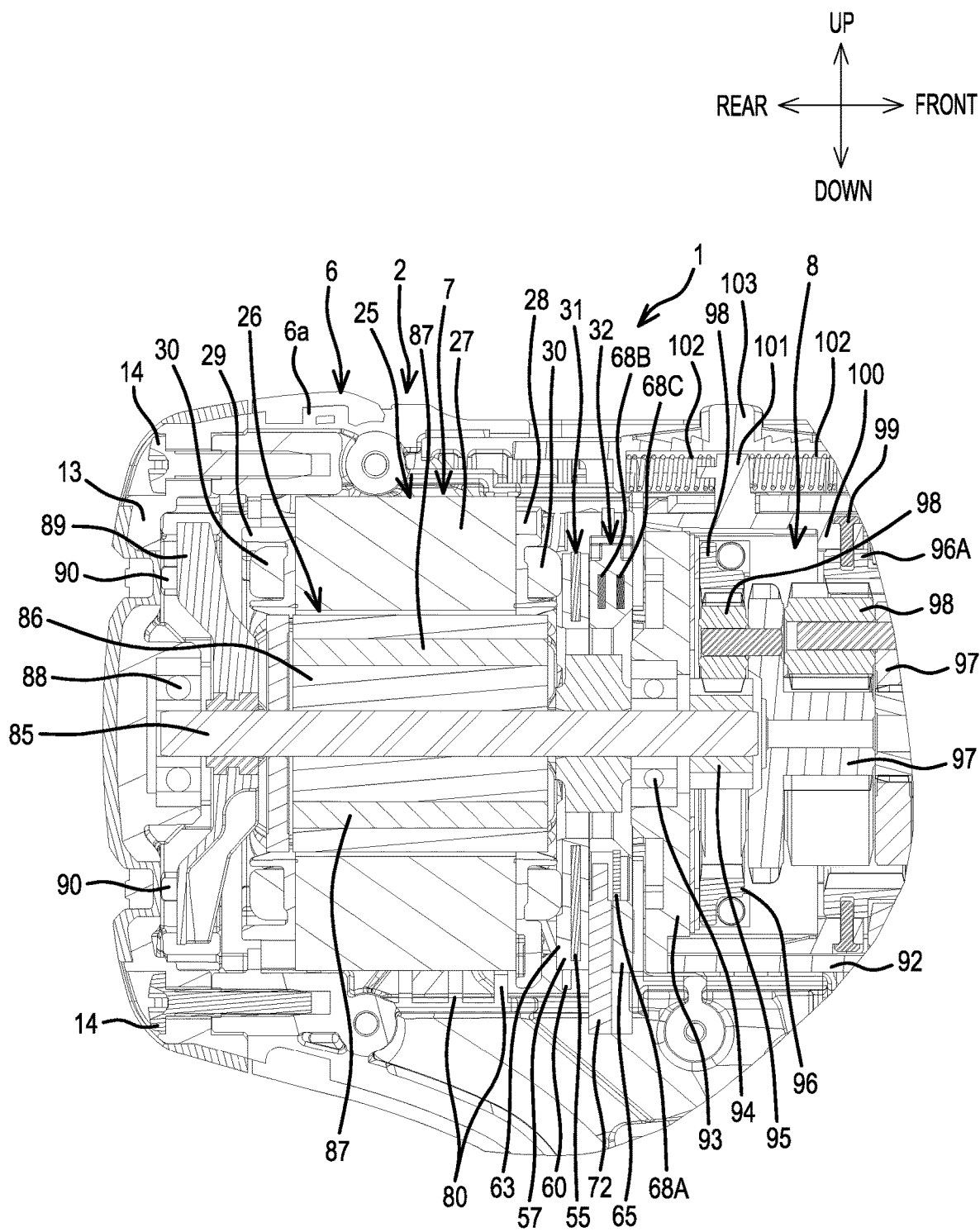
FIG. 3 is a partial enlarged view of a portion of a brushless motor that may be utilized in the driver drill of FIGS. 1 and 2.
Figure 16:
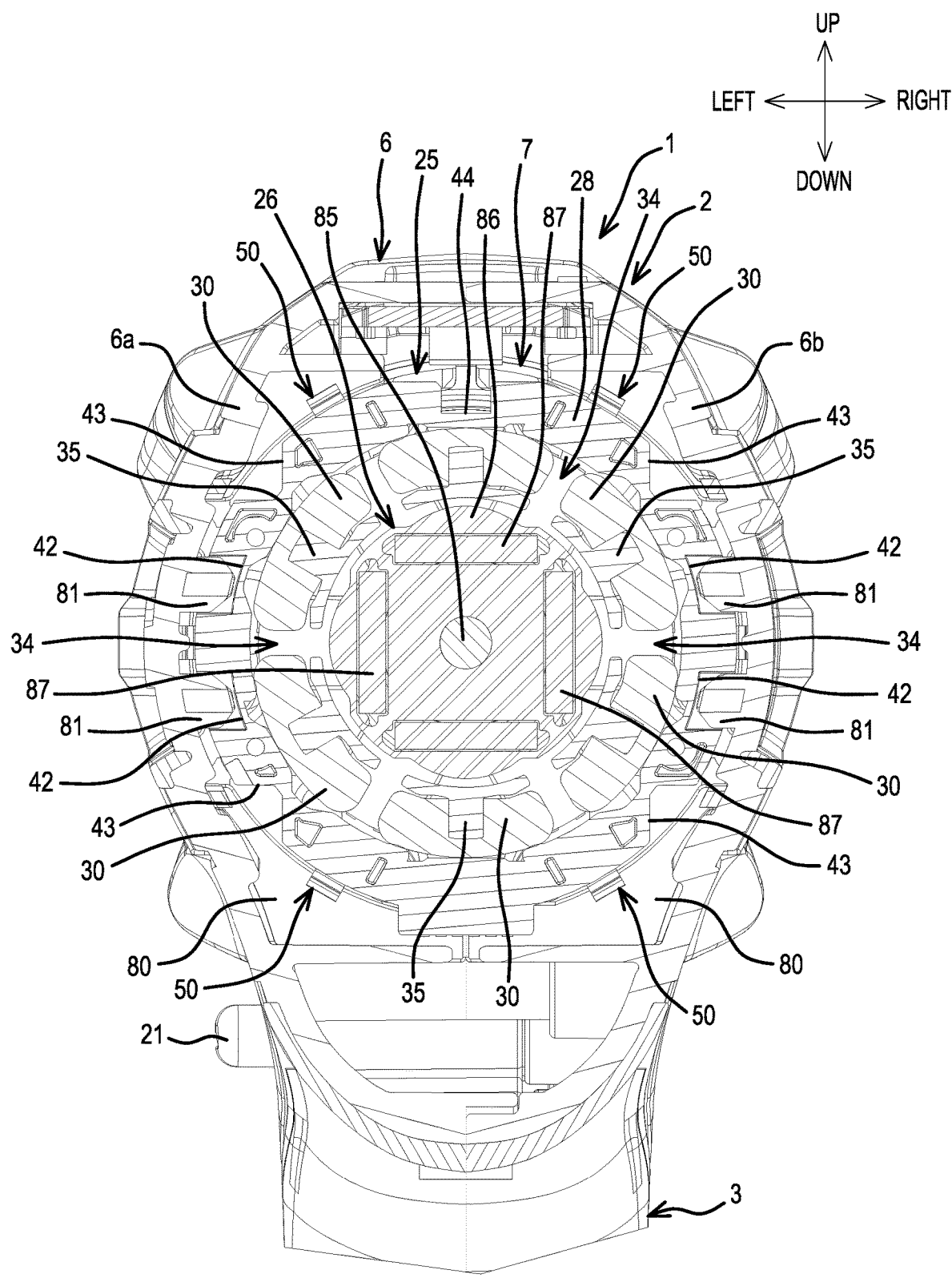
FIG. 16 is a partial, transverse, cross-sectional view of the driver drill through a portion of the first insulator.

The thus-manufactured stator 25 is positioned (held) in the axial direction and in the circumferential direction of the housing by support ribs 80, which project in the circumferential direction from the inner surfaces of the half housings 6a, 6b of the main-body housing 6, as shown in FIG. 3, and by projections 81, which project from the inner surfaces of the half housings 6a, 6b and respectively mate in the recesses 42 formed in the side surfaces of the first insulator 28, as shown in FIG. 16.

The first and second notches 43, 44, the transverse notches 45, the bevel 46, etc. are also used to position the stator 25 within the housing.

Explanation of Other Structural Members

Referring now to FIGS. 2 and 3, the rotor 26 comprises: a rotary shaft 85, which is located at the axial center of the rotor 26; a rotor core 86, which has a tube shape and is disposed around the rotary shaft 85; and four plate-shaped permanent magnets 87, which are embedded within the rotor core 86.

The rear end of the rotary shaft 85 is axially supported in a rotatable manner by a rear bearing 88, which is held by the rear cover 13. A centrifugal fan 89 is mounted on the rotary shaft 85 forward of the rear bearing 88. Air-exhaust ports 90 are formed in the left and right side surfaces of the rear cover 13, and air-intake ports 91 (FIG. 1) are formed in the left and right side surfaces of the main-body housing 6.

A gear case 92 houses the planetary-gear, speed-reducing mechanism 8 and is provided forward of the brushless motor 7. The front end of the rotary shaft 85 is inserted through a cap 93, which closes up a rear end of the gear case 92, and is axially supported by a front bearing 94, which is held by the cap 93. A pinion 95 is secured to the front end of the rotary shaft 85.

The planetary-gear, speed-reducing mechanism 8 has a well-known structure, in which three carriers 97, which respectively support planet gears 98 that revolve inside internal gears 96, are provided such that they are parallel in the axial direction. The pinion 95 meshes with the first-stage planet gear 98. In addition, the second-stage internal gear 96 (hereinbelow, indicated as 96A in order to differentiate it) is provided such that it is capable of moving forward and rearward in the axial direction between: an advanced position, at which the internal gear 96A is fixed (i.e. such that relative rotation is blocked) within the gear case 92 and causes the second-stage planet gear 98 to revolve; and a retracted position, at which the internal gear 96A simultaneously meshes with the second-stage planet gear 98 and the first-stage carrier 97 and causes the carrier 97 and the planet gear 98 to rotate integrally, thereby cancelling the second-stage speed reduction. A speed-changing ring 100 is coupled to the internal gear 96A via pins 99, and a latching projection 101 at an upper end of the speed-changing ring 100 is coupled to a speed-changing button 103 on an upper surface of the main-body housing 6 via front and rear coil springs 102, 102. Therefore, when the speed-changing button 103 is manually slid forward and rearward, it causes the internal gear 96A to respectively move forward and rearward via the speed-changing ring 100, making it possible to select a low-speed mode at the advanced position and a high-speed mode at the retracted position. The third-stage carrier 97 is coupled to the spindle 11 such that it is capable of integrally rotating therewith. The spindle 11 is axially supported by front and rear bearings 104, 104 inside the gear case 92.

In the clutch mechanism 10, the internal gear 96 (hereinbelow, indicated as 96B in order to differentiate it), with which the third-stage planet gear 98 meshes, is held in a rotatable manner. Forward thereof, a pin, which is not shown and latches with the internal gear 96B from the front, is provided on the gear case 92. A coil spring 106, which presses the internal gear 96B via a washer 105, is externally mounted on that pin at the front-end outer circumference of the gear case 92. The amount of axial force applied by the coil spring 106 against the internal gear 96B can be changed by rotating the clutch-adjusting ring 16, which moves a retaining ring 107 in the front-rear direction and thereby change the axial length of the coil spring 106. For example, at a driver-mode position of the mode-changing ring 15, if the load in the rotational direction that is applied to the internal gear 96B via the spindle 11 exceeds the pressing force of the coil spring 106, then the latching of the internal gear 96B by the pin is released, the internal gear 96B idles, and thereby the transmission of torque to the spindle 11 is blocked. On the other hand, at a drill-mode position of the mode-changing ring 15, because a locking member 108 directly presses the washer 105 and therefore idling of the internal gear 96B is prevented, the clutch does not operate and the spindle 11 rotates continuously.

Referring now to the lower portion of FIG. 4, a terminal block 110, to which the battery pack 5 is mounted by sliding from the front, is provided inside the battery-mount part 4. On an upper side of the terminal block 110, a controller 111, which is configured by housing a control circuit board 112—on which a microcontroller, a switching device, and the like (not shown) are installed—in a dish-shaped case 113, is provided parallel to the terminal block 110. A display part 114 displays, e.g., the current operating mode of the power tool, the remaining charge of the battery, etc., and is provided on an upper surface of the front portion of the control circuit board 112 such that it is exposed at or on an upper surface of the battery-mount part 4.

Explanation Concerning a Representative Method for Operating the Driver Drill

In the driver drill 1 configured as described above, when the trigger 20 is squeezed, the switch 19 turns ON and the brushless motor 7 is driven by the power supply of (current from) the battery pack 5. That is, the microcontroller of the control circuit board 112 obtains the rotational state of the rotor 26 by acquiring the rotation-detection signals, which were output from the rotation-detection devices 56 of the sensor circuit board 31 and indicate the positions of the permanent magnets 87 of the rotor 26, controls the ON/OFF state of each switching device in accordance with the obtained rotational state, supplies electric current, in order, to each of the coils 30 of the stator 25, and thereby causes the rotor 26 to rotate. Thereby, the rotary shaft 85 rotates, and the rotation, whose speed is reduced by the planetary-gear, speed-reducing mechanism 8, is transmitted to the spindle 11 and rotates the chuck 17. By rotating the mode-changing ring 15, it is possible to select either (a) a driver mode, wherein the clutch mechanism 10, to which the transmission of rotation at the prescribed torque is blocked, functions, or (b) a drilling mode, wherein the clutch mechanism 10 does not function. Furthermore, by rotating the clutch-adjusting ring 16, it is possible to adjust the amount of torque at which the clutch mechanism 10 operates in the driver mode.

In the present embodiment, because the coils 30 of the brushless motor 7 are connected in parallel in sets of two, the winding resistance is reduced and thereby a large current can be supplied to the coils 30. Furthermore, because this parallel connection can be achieved by using the short-circuiting member 32, space can be saved. That is, as shown in FIG. 6B, because the short-circuiting member 32 is assembled (mounted) such that the short-circuiting member 32 does not protrude forward of the tips of the first projections 38 of the retaining parts 37, the space forward of the sensor circuit board 31 can be utilized effectively for installing the short-circuiting member 32, which facilitates making the stator more compact in the axial direction.

In addition, because the six coils 30 are wound with a single magnet wire, all the coils 30 can be completely wound in a single step. Moreover, crossover wires that provide connections between diagonal coils 30, 30 also become unnecessary. The absence of crossover wires also leads to making the stator more compact. Furthermore, because the sensor circuit board 31 is provided on one-end side of the brushless motor 7 and the power is supplied to the coils 30 from the same side, this aspect of the design also makes it possible to supply a large current while facilitating making the stator more compact in the axial direction. In particular, because the sensor circuit board 31 and the short-circuiting member 32 are arranged, in that order, in parallel on the one-end side of the stator 25, the sensitivity of the sensors is satisfactory.

Advantageous Effects of Using Screws to Affix the Fusing Terminals with the Sheet-Metal Members In a first aspect of the driver drill 1 of the above-described embodiment, it comprises: the stator core 27; the first insulator (insulator) 28, which is held on the stator core 27; the plurality of coils 30, which are respectively wound through (around) the first insulator 28 and on the stator core 27; the plurality of fusing terminals (coil terminals) 50, which are held by the first insulator 28 and are respectively connected to the coils 30; and the short-circuiting member 32, which has the short-circuiting pieces (lead-wire terminals) 69A-69C of the first, second and third sheet-metal members 68A-68C that are respectively connectable to the fusing terminals 50. Furthermore, the short-circuiting member 32 is detachably affixed to the first insulator 28 using the screws 76, which also causes the fusing terminals 50 to be respectively electrically connected to the first, second and third sheet-metal members 68A-68C.

Because no soldering is necessary in this design, variation in the manufactured products is reduced and the work (assembly) time is also shortened. In addition, if either the stator 25 or the controller 111 requires repair, the two can be simply disconnected by removing the screws 75, 76, and therefore removal and repair of just one of them can be performed easily. Furthermore, the configuration is very practical (rational) because the electrical connection between the fusing terminals 50 and the first, second and third sheet-metal members 68A-68C as well as the fixing of the short-circuiting member 32 to the first insulator 28 can be accomplished by the (same) screws 76.

For example, because the fusing terminals 50 can be respectively connected to the first, second and third sheet-metal members 68A-68C (via the respective short-circuiting pieces 69A-C) by the screws 76, the short-circuiting member 32 is also physically attached (fixed) to the first insulator 28, and therefore the electrical connection between the terminals and the fixing (physical attachment) of the short-circuiting member 32 can be accomplished simultaneously by the (same) screws 76.

In addition, it is noted that the short-circuiting member 32 comprises the polymer insulation part 65, which holds the first, second and third sheet-metal members 68A-68C. Therefore, if the insulation part 65 is (also) fixed (physically attached) to the first insulator 28 by one or more of the screws (second screws) 75, the sheet-metal members 68A-68C can be held in a stable manner, and the short-circuiting member 32 can be physically attached to the first insulator 28 in a robust manner.

Furthermore, the rotor 26 is disposed in the interior of the stator core 27, and the sensor circuit board 31 detects the positions of the permanent magnets 87 provided on the rotor 26. Therefore, if the sensor circuit board 31 is fixed, by the screw(s) 75, between the first insulator 28 and the short-circuiting member 32, it becomes possible to easily affix the sensor circuit board 31 by using the same screws 75 that affix the short-circuiting member 32.

In addition or in the alternative, it is noted that, in a second aspect of the driver drill 1 of the above-described embodiment, it comprises: the stator core 27; the first insulator (insulator) 28, which is held on the stator core 27; the coils 30, which are wound through (around) the first insulator 28 and on the stator core 27; the fusing terminals 50 (coil terminals), which are held by the first insulator 28, are respectively connected to the coils 30, and have the female threads 54 formed therein; and the first, second and third sheet-metal members 68A-68C, which are respectively connectable to the fusing terminals 50 via the short-circuiting pieces (lead-wire terminals) 69A-C. Furthermore, the fusing terminals 50 are respectively electrically connected the first, second and third sheet-metal members 68A-68C by virtue of the sheet-metal members 68A-68C being fixed to the fusing terminals 50 by the screws 76, which are respectively screwed into the female threads 54.

Similar to the above-described first aspect of the driver drill of the above-described embodiment, because no soldering is necessary in this design, variation in the manufactured products is reduced and the work (assembly) time is also shortened. In addition, if either the stator 25 or the controller 111 requires repair, the two can be simply disconnected by removing the screws 75, 76, and therefore removal and repair of just one of them can be performed easily. Furthermore, because the female threads 54 are formed in the fusing terminals 50, the part count can be reduced, which may facilitate manufacturing cost reductions.

More particularly, if the female threads 54 are formed integrally with the fusing terminals 50 (i.e. one-piece with no seam between the female thread 54 and the remainder of the fusing terminal 50), separate nuts also become unnecessary, which may also facilitate manufacturing cost reductions.

It is noted that the shape, the arrangement, and the like of the sheet-metal members and the short-circuiting member are not limited to those in the above-mentioned embodiment and can be modified as appropriate. The short-circuiting member can also be made into a C shape, a semicircular shape, or the like instead of a ring shape. In addition, one or more of the sheet-metal members may be mounted on the surface(s) of the short-circuiting member instead of being insert-molded (embedded therein).

With regard to the fusing terminals, too, instead of forming the female threads by forming the curl-shaped nut parts, separate nuts may be welded onto the fusing terminals, and moreover, the shape of the nut parts is not limited to that in the above-mentioned embodiment.

In addition, the arrangement of the fusing terminals is also not limited to that in the above-mentioned embodiment; for example, the fusing terminals may be arranged at the locations of the teeth. Likewise, the arrangement of the screw bosses is also not limited to that in the above-mentioned embodiment; for example, the screw bosses may be arranged between the teeth.

Furthermore, although the screws 76 are used in order to physically and electrically connect the fusing terminals 50 with the sheet-metal members 68A-68C in the above-mentioned embodiment, the screws 76 can also be eliminated as long as the electrical connection between the terminals can be ensured by the fixing (physical attachment) of the short-circuiting member 32 to the first insulator 28 using the screws 75.

Figure 17:
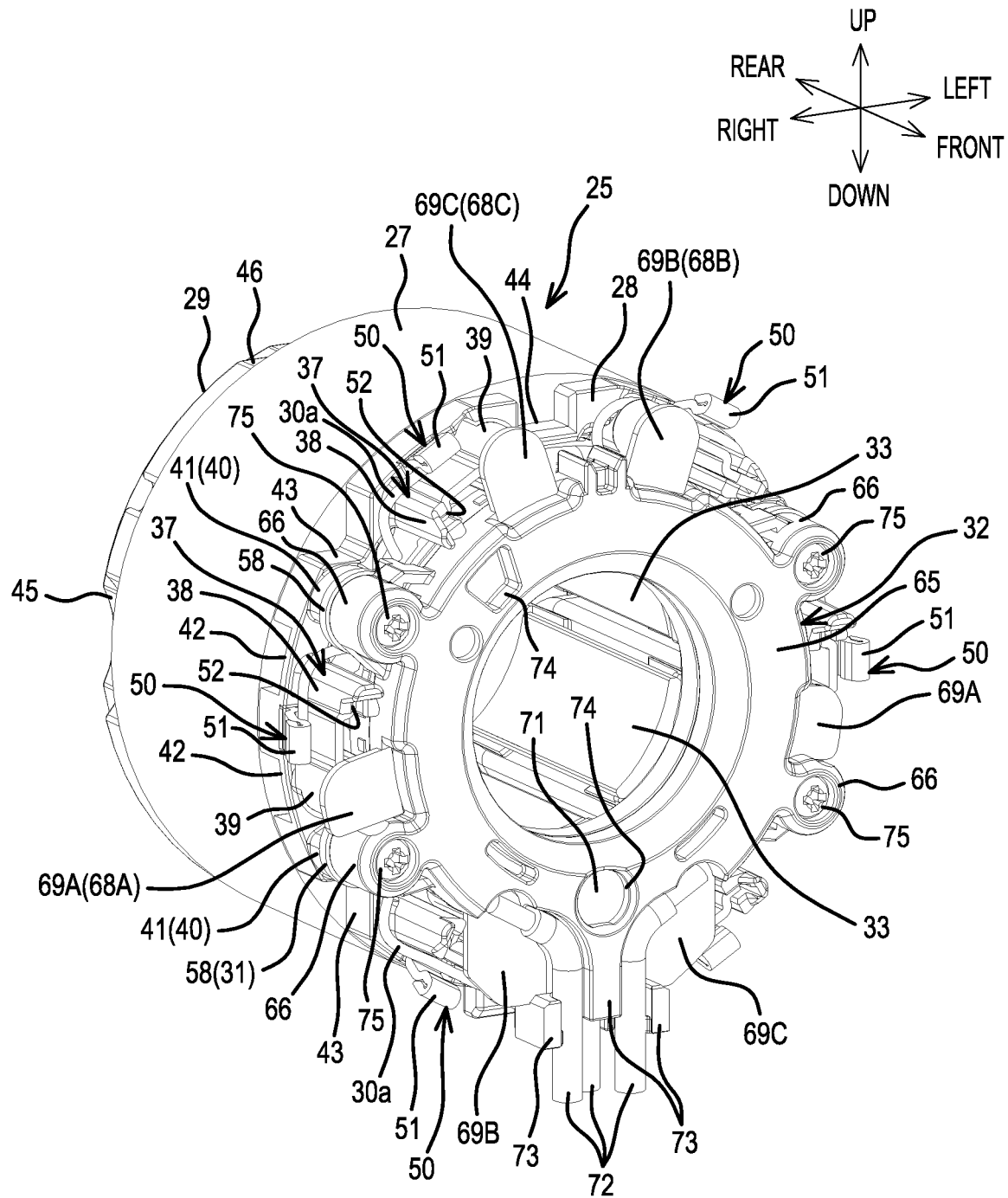
FIG. 17 is an oblique view of the stator, viewed from the front, according to a second embodiment of the present teachings.

FIG. 17 shows a second embodiment of the present teachings in accordance with such a modification. More particularly, in the second embodiment shown in FIG. 17, the screws 75 fix the short-circuiting member 32 to the first insulator 28 with a prescribed fastening (pressing) force. In this embodiment, the female threads 54 of the fusing terminals 50 and the screws 76 can be omitted as long as the dimensions and shapes of the fusing terminals 50 and the short-circuiting pieces (lead-wire terminals) 69A-C are set particularly such that, when the screws 75 are screwed into the first insulator 28, the fusing terminals 50 and the short-circuiting pieces (lead-wire terminals) 69A-C of the sheet-metal members 68A-68C of the short-circuiting member 32 are brought into close contact, i.e. a direct electrical connection is formed by the physical contact of the (metal) fusing terminals 50 with the corresponding (metal) short-circuiting pieces (lead-wire terminals) 69A-C.

In another (alternative) modification of the first embodiment, the screws 75 for fixing the short-circuiting member 32 can be omitted, as long as the short-circuiting member 32 can be stably supported by (only) the screws 76.

Figure 18:
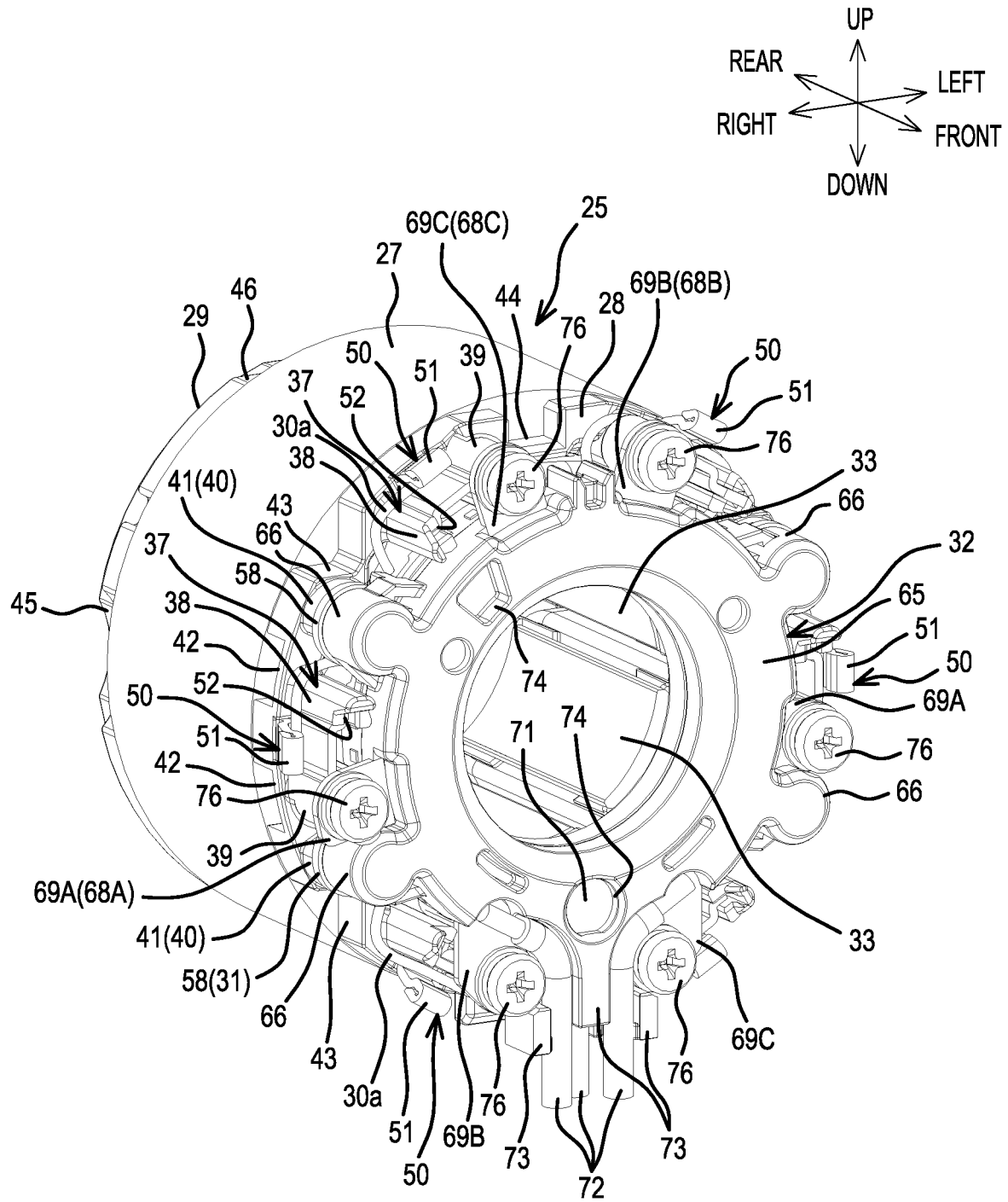
FIG. 18 is an oblique view of the stator, viewed from the front, according to a third embodiment.

Thus, FIG. 18 shows a third embodiment of the present teachings in accordance with such a modification. More particularly, in the third embodiment shown in FIG. 18, the screws 76 may be respectively screwed into the female threads 54 of the fusing terminals 50 and then into corresponding female threads (not shown) defined in the first insulator 28 behind each of the female threads 54, so that the short-circuiting member 32 can be fixed relative to the first insulator 28 with a prescribed fastening (pressing) force. That is, when the screws 76 are fixed in the female threads of the first insulator 28, it causes the short-circuiting member 32 to become screw-fastened directly to the first insulator 28 owing to the fact that the screws 76 pass through the through holes 70 in the short-circuiting member 32, through the female threads 54 of the fusing terminals 50 and into the female threads formed in the first insulator 28. In this third embodiment, it is necessary to set the dimensions of the sensor circuit board 31 so that it does not rattle. If the screws 75 are omitted, then the screw bosses 40, the through holes 59 of the projections 58 of the sensor circuit board 31, and the screw bosses 66 can also be omitted. In such an embodiment, concave and convex parts that mate with one another may be provided between the short-circuiting member 32 and the first insulator 28, a positioning part that engages one of them to the other side may be provided, or the like.

In the alternative to forming female threads in the first insulator 28 for receiving the screws 76, it is also possible to modify the first projections 38 and the second projections 39 so as to robustly latch the fusing terminals 50 therein. In such a modification, the short-circuiting member 32 becomes fixed to the first insulator 28 via the latched connection to the fusing terminals 50.

Advantageous Effects of a Stator Manufacturing Method According to the Present Teachings A driver drill 1 according to any of the above-described embodiments may be manufactured with the stator 25 of the brushless motor 7 (electric-work-machine motor) by: winding a magnet wire 30A (winding wire) to form one or more of the coils 30 on the stator core 27 while (at least) the first insulator 28 (insulator) is held on the stator core 27; fusing respective portions of the magnet wire 30a between the coils 30 to the fusing terminals 50 (coil terminals) held by the first insulator 28; and electrically connecting the first, second and third sheet-metal members 68A-68C to the fusing terminals 50 by screw-connecting the first, second and third sheet-metal members 68A-68C, to which the power-supply lines 72 (lead wires) are respectively connected, to the first insulator 28, whereby the fusing terminals 50 come into electrical connection with the first, second and third sheet-metal members 68A-68C.

According to such a manufacturing method, the soldering performed in the past to electrically connect the fusing terminals 50 with the first, second and third sheet-metal members 68A-68C becomes unnecessary, thereby making it possible to reduce assembly labor. In addition, owing to the use of screw-fastening, the steps between the winding of the coils 30 and the completion of the stator 25 are not unchangeable, thereby permitting additional degrees of freedom in the design of the steps.

In addition, if the fusing terminals 50 include integral female threads 54 for use in the screw-connection, then separate nuts are unnecessary, which reduces the part count and possibly manufacturing costs.

Figure 19:
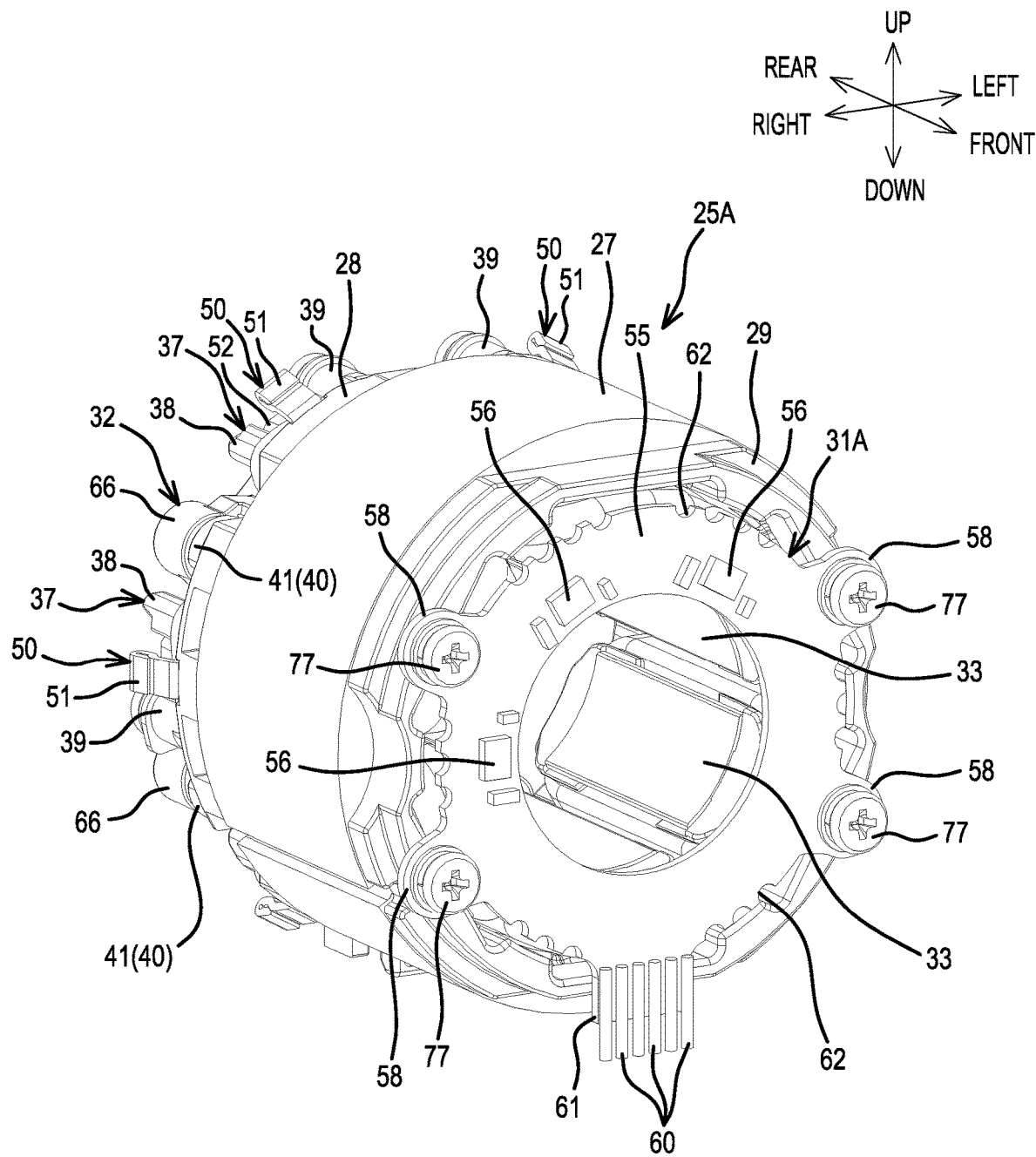
FIG. 19 is an oblique view of the stator, viewed from the front, according to a fourth embodiment.
Figure 20:
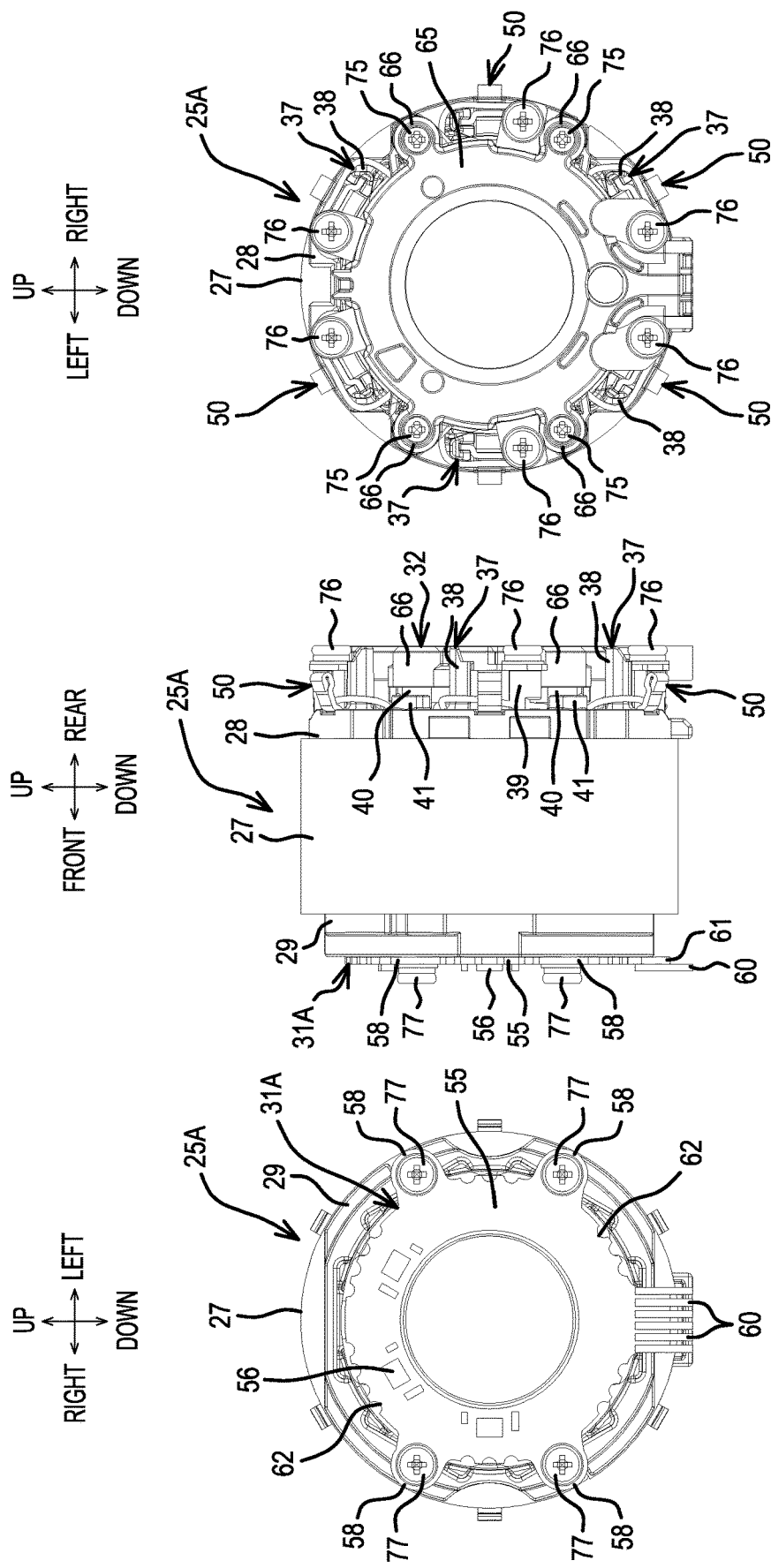
FIGS. 20A-C are explanatory diagrams of the stator according to the fourth embodiment, in a front view, in a side view, and in a rear view, respectively.
Figure 21:
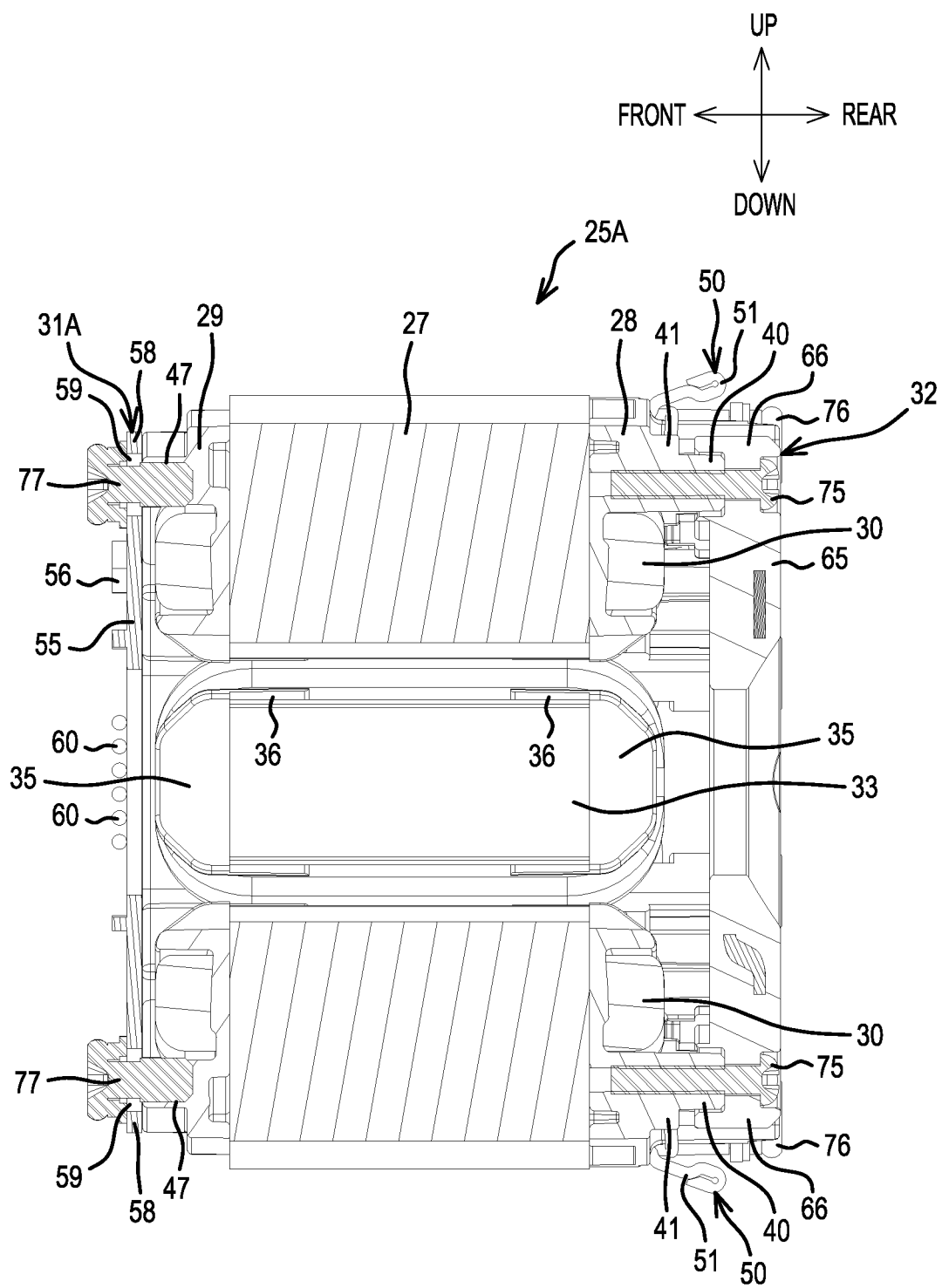
FIG. 21 is a center, longitudinal, cross-sectional view of the stator according to the fourth embodiment.

It is noted that, although the sensor circuit board and the short-circuiting member are disposed on the first insulator side in the above-mentioned embodiments, they may be both disposed on the second insulator side. In addition, the sensor circuit board and the short-circuiting member are not limited to being disposed on the same insulator side. For example, in modified stator 25A according to a fourth embodiment of the present teachings shown in FIGS. 19-21, only the short-circuiting member 32 is fixed (physically attached) to the first insulator 28 via the screws 75 and the screw bosses 40 and the sheet-metal members 68A-68C are electrically connected to the fusing terminals 50 by the screws 76. The second insulator 29 has screw holes 47 formed therein, and the projections 58 of a sensor circuit board 31A can be fixed (physically attached) to the second insulator 29 by screws 77 that engage in the respective screw holes 47. In this fourth embodiment, the sensor circuit board 31A is not covered by a resin part (polymer) and the standalone board 55 is affixed to the second insulator 29 with the rotation-detection devices 56 facing the outer side (rear side). Of course, the arrangement of the sensor circuit board 31A and the short-circuiting member 32 also may be reversed forward and rearward, i.e. the sensor circuit board 31A may be mounted on the first insulator 28 and the short-circuiting member 32 may be mounted on the second insulator 29.

Figure 22:
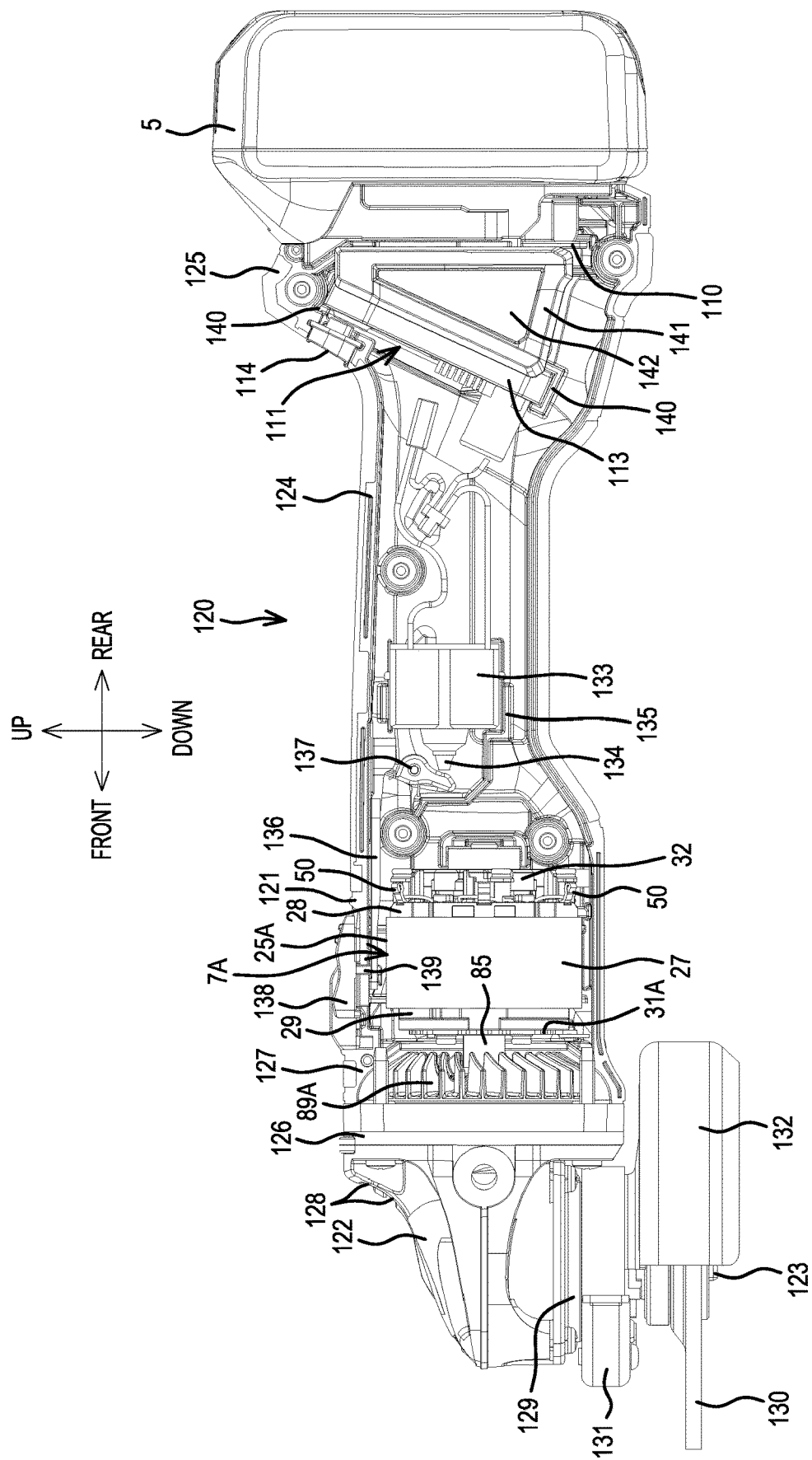
FIG. 22 is a center, longitudinal, cross-sectional view of a grinder that uses the stator of the fourth embodiment. It is a cross-sectional view taken along a longitudinal center line.

FIG. 22 shows a rechargeable grinder 120 as one representative, non-limiting example of an electric work machine that uses the stator 25A of the fourth embodiment. The grinder 120 has a tubular motor housing 121, in which a brushless motor 7A that uses the above-mentioned stator 25A is housed with the second insulator 29 set on the front side. Furthermore, a gear housing 122, from which a spindle 123 protrudes downward, is disposed forward of the motor housing 121. A tube-shaped grip housing 124, whose diameter is smaller than that of the motor housing 121 and is located eccentrically upward, is provided rearward of the motor housing 121. A battery-mount part 125, which houses the controller 111, is provided rearward of the grip housing 124. The entire grinder 120 is configured such that it extends overall in the front-rear direction.

The motor housing 121, the grip housing 124, and the battery-mount part 125 are formed by assembling (joining), using screws, a pair of left and right half housings having an integrated tube shape. The motor housing 121 and the gear housing 122 are coupled, using screws from the front, via a gear-housing cover 126, which has a disk shape.

The brushless motor 7A herein is housed inside the motor housing 121 with an attitude such that the rotary shaft 85 faces forward in the front-rear direction, and the front end of the rotary shaft 85 is axially supported by a bearing (not shown) held by the gear-housing cover 126 and protrudes into the gear housing 122. A centrifugal fan 89A, which is formed of a resin (polymer), into which a magnetic material has been kneaded, and which is magnetized such that its N poles and S poles alternate in the rotational direction, is mounted on the rotary shaft 85 rearward of the gear-housing cover 126. In this embodiment, the centrifugal fan 89A is also provided with the function of sensor magnets, and therefore permanent magnets need not be provided in the rotor 26. However, instead of forming the centrifugal fan 89A of a magnetic material, the front and rear of the sensor circuit board 31A may be oppositely oriented, and the permanent magnets 87 provided in the rotor 26 may be detected as in the previous embodiment.

A through hole (not shown) is provided in the gear-housing cover 126. Air from the centrifugal fan 89A that is guided forward by a baffle part 127, which is provided on a front part of the motor housing 121, can be delivered into the gear housing 122. Air-exhaust ports 128 are formed in the front surface of the gear housing 122.

A bevel gear (not shown) is fastened to a front end of the rotary shaft 85, which protrudes into the gear housing 122, and meshes with a bevel gear (not shown) fastened to an upper end of the spindle 123. The spindle 123 is axially supported by upper and lower bearings (not shown), which are held by the gear housing 122 and a bearing box 129 that is assembled to the lower part of the gear housing 122, and protrudes downward. A tool accessory 130, such as a discoidal (disk-shaped) grinding wheel, can be mounted on a lower end of the spindle 123. A wheel cover 132 that covers a rear-half of the tool accessory 130 is mounted, using a belt-shaped clamp 131, on an outer circumference of the bearing box 129.

On the upper side of the interior of the grip housing 124, a switch 133, which turns ON by pressing a button 134, is retained, with an attitude such that the button 134 faces forward, by a retaining rib 135, which is provided such that it protrudes from an inner surface of the grip housing 124. In this design, a space for passing the power-supply lines 72, the signal lines 60, etc. therethrough is formed downward of the switch 133. In addition, a slide bar 136, which is slidable forward and rearward, is provided upward of the switch 133.

A rear end of the slide bar 136 is coupled to a pressing lever 137, which is disposed forward of the button 134 and is biased toward a clockwise rotation position at which the button 134 is not pressed. A forward/rearward-slidable switch knob 138 is provided on an upper surface of the motor housing 121. A latching piece 139 is provided on a lower surface of the switch knob 138, protrudes into the motor housing 121 and is latched to a front end of the slide bar 136.

According to this configuration, when the switch knob 138 is manually slid forward, the slide bar 136 also slides forward, the button 134 is pressed by the pressing lever 137 being rotated counterclockwise, and thereby the switch 133 is turned ON. When the switch knob 138 is manually released, the slide bar 136 slides to the retracted position, the pressing lever 137 returns to the clockwise rotation position, and the switch 133 is turned OFF.

In this embodiment, the controller 111 is supported, with a tilted attitude such that a lower end is located forward of the upper end, by ribs 140, 140, which are provided on an inner surface of the battery-mount part 125. The display part 114 is exposed at a front surface of the battery-mount part 125. Rearward of the controller 111, the terminal block 110, on which the battery pack 5 is mounted by being slid from above, is held with an attitude such that it is orthogonal to the front-rear direction. A window frame 141, which comprises an air-suction port 142 covered by a screen, is mounted between the controller 111 and the terminal block 110.

With this grinder 120, too, the same as in the driver drill 1 of the above-described embodiments, it becomes possible to electrically connect the terminals and to assemble the short-circuiting member 32 without performing soldering on the stator 25A, and thereby manufacturability is improved. In addition, even only one of the stator 25A or the controller 111 has to be repaired, the two can be simply disconnected by removing the screws 75, 76, thereby expediting the repair procedure because it is not necessary to remove a solder connection between the stator 25A and the controller 111. Furthermore, the configuration is a practical because both the electrical connection between the fusing terminals 50 and the first, second and third sheet-metal members 68A-68C and the fixing (physical attachment) of the short-circuiting member 32 and the first insulator 28 can be accomplished by the screws 76. Furthermore, because the female threads 54 are formed in the fusing terminals 50, the part count can be reduced, which may lead to manufacturing cost reductions.

It is noted that, in the grinder 120, too, the screws 75 for fixing the short-circuiting member 32 can also be omitted, as long as the short-circuiting member 32 can be stably supported by the screws 76 that physically connect and electrically connect the fusing terminals 50 and the sheet-metal members 68A-68C. Conversely, only the screws 75 for fixing the short-circuiting member 32 can be used to secure the short-circuiting member 32 to the first insulator 28 (whereby the fusing terminals 50 become electrically connected to the sheet-metal members 68A-68C by direct contact), so that the screws 76 can be omitted.

In addition, in common with each of the above-described aspects and embodiments of the present teachings, the electric work machine is not limited to a power tool that drives a tool accessory, such as a driver drill, a circular saw, or a grinder, and to the present teachings can also be used in a vacuum cleaner, a lawn mower, and, furthermore, to gardening tools such as a blower. In addition, the present teachings can also be adapted to electric work machines that use a sensorless brushless motor having no sensor circuit board.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved motors, e.g., brushless motors, for use in a variety of electric work machines, such as power tools and outdoor power equipment.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Driver drill
2 Main-body part
3 Handle
4 Battery-mount part
6 Main-body housing
7, 7A Brushless motor
11 Spindle
25, 25A Stator
26 Rotor
27 Stator core
28 First insulator
29 Second insulator
30 Coil
30a Magnet wire
31, 31A Sensor circuit board
32 Short-circuiting member
37 Retaining part
38 First projection
39 Second projection
40 Screw boss
50 Fusing terminal
51 Sandwiching piece
52 Insertion piece
53 Nut part
54 Female thread
55 Board
56 Rotation-detection device 57 Resin part (polymer)
60 Signal line
65 Insulation part
66 Boss
68A First sheet-metal member
68B Second sheet-metal member
68C Third sheet-metal member
69A-69C Short-circuiting pieces (lead-wire terminals)
72 Power-supply line (lead wire)
75, 76 Screws
85 Rotary shaft
87 Permanent magnet
111 Controller
112 Control circuit board
120 Grinder

I claim:

1. An electric motor comprising:
a stator having an insulator held on a stator core, a plurality of coils wound around the insulator and on the stator core, and a plurality of coil terminals held by the insulator and respectively electrically connected to the plurality of coils;
a rotor rotatably disposed within the stator core; and
a short-circuiting member having a plurality of lead-wire terminals that are respectively connectable to the plurality of coil terminals;
wherein:
the coil terminals are respectively electrically connected to the lead-wire terminals by virtue of the short-circuiting member being detachably affixed to the insulator by a plurality of first screws; and
the plurality of first screws respectively pass through a plurality of through holes respectively formed in the plurality of lead-wire terminals and threadably engage in a plurality of female threads respectively formed in the plurality of coil terminals.

2. The electric motor according to claim 1, wherein the plurality of first screws conduct electric current from the plurality of lead-wire terminals to the plurality of coil terminals.

3. The electric motor according to claim 2, wherein the lead-wire terminals are respectively connected to different power supply lines that supply current to energize the coils.

4. The electric motor according to claim 3, wherein the plurality of first screws physically attach the short-circuiting member to the insulator.

5. The electric motor according to claim 4, further comprising:
a sensor circuit board that detects the position of one or more permanent magnets in or on the rotor;
wherein the sensor circuit board is interleaved between the insulator and the short-circuiting member; and
the plurality of first screws respectively pass through a plurality of through holes formed in the sensor circuit board.

6. The electric motor according to claim 1, wherein:
the short-circuiting member further comprises an insulating polymer part that holds the plurality of lead-wire terminals; and
the insulating polymer part is affixed to the insulator by one or more second screws.

7. The electric motor according to claim 6, wherein:
the plurality of first screws conduct electrical current from the plurality of lead-wire terminals to the plurality of coil terminals; and
the one or more second screws do not conduct electrical current from the plurality of lead-wire terminals to the plurality of coil terminals.

8. The electric motor according to claim 7, wherein the lead-wire terminals are respectively connected to different power supply lines that supply current to energize the coils.

9. The electric motor according to claim 8, further comprising:
a sensor circuit board that detects the position of one or more permanent magnets in or on the rotor;
wherein the sensor circuit board is interleaved between the insulator and the short-circuiting member; and
the one or more second screws respectively pass through one or more first through holes formed in the sensor circuit board.

10. The electric motor according to claim 9, wherein the plurality of first screws respectively pass through a plurality of second through holes formed in the sensor circuit board.

11. The electric motor according to claim 1, wherein:
the short-circuiting member further comprises an insulating polymer part that holds the plurality of lead-wire terminals; and
the insulating polymer part is affixed to the insulator by the plurality of first screws.

12. The electric motor according to claim 11, wherein the coil terminals are respectively electrically connected to the lead-wire terminals by direct contact of the coil terminals with the respective lead-wire terminals.

13. The electric motor according to claim 1, wherein the lead-wire terminals are respectively connected to different power supply lines that supply current to energize the coils.

14. The electric motor according to claim 1, wherein the plurality of first screws physically attach the short-circuiting member to the insulator.

15. An electric motor comprising:
a stator having an insulator held on a stator core, at least one coil wound around the insulator and on the stator core, and at least one coil terminal held by the insulator and electrically connected to the at least one coil;
a rotor rotatably disposed within the stator core; and
at least one lead-wire terminal electrically and physically connected to the at least one coil terminal by a first screw that passes through a through hole in the at least one lead-wire terminal and threadably engages in a female thread formed in the at least one coil terminal.

16. The electric motor according to claim 15, wherein the female thread is formed integrally with the at least one coil terminal.

17. The electric motor according to claim 16, further comprising:
a short-circuiting member having an insulating polymer part that holds the lead-wire terminal; and
wherein the insulating polymer part is affixed to the insulator by at least one second screw that threadably engages in a screw boss formed in the insulator.

18. The electric motor according to claim 17, further comprising:
a sensor circuit board that detects the position of one or more permanent magnets in or on the rotor;
wherein the sensor circuit board is interleaved between the insulator and the short-circuiting member; and
the first screw and the second screw respectively pass through a plurality of through holes formed in the sensor circuit board.

19. A method of manufacturing a stator of an electric motor, comprising:
- winding a magnet wire around a tooth formed on a stator core and an insulator held on the stator core to form at least one coil;
- fusing a portion of the magnet wire to a coil terminal held by the insulator; and
- electrically connecting a lead-wire terminal and the coil terminal by screw-connecting the lead-wire terminal, to which a lead wire is connected, to the coil terminal.

20. The method according to claim 19, wherein a female thread is integrally formed in the coil terminal and engages a screw that passes through a through hole in the lead-wire terminal.

* * * * *